(12) United States Patent
Miyashita et al.

(10) Patent No.: US 12,468,070 B2
(45) Date of Patent: Nov. 11, 2025

(54) OPTICAL FILM, OPTICAL-FILM-EQUIPPED POLARIZING PLATE, AND DISPLAY DEVICE

(71) Applicant: Dai Nippon Printing Co., Ltd., Tokyo (JP)

(72) Inventors: Masashi Miyashita, Tokyo (JP); Yuki Katsura, Tokyo (JP); Kazunobu Ogawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 617 days.

(21) Appl. No.: 17/904,112

(22) PCT Filed: Nov. 18, 2020

(86) PCT No.: PCT/JP2020/042966
§ 371 (c)(1),
(2) Date: Aug. 12, 2022

(87) PCT Pub. No.: WO2021/161209
PCT Pub. Date: Aug. 19, 2021

(65) Prior Publication Data
US 2023/0083180 A1 Mar. 16, 2023

(30) Foreign Application Priority Data
Feb. 13, 2020 (JP) .................................. 2020-022518
Sep. 18, 2020 (JP) .................................. 2020-157680

(51) Int. Cl.
*G02B 1/11* (2015.01)
*G02B 5/30* (2006.01)
*H10K 59/80* (2023.01)

(52) U.S. Cl.
CPC .............. *G02B 1/11* (2013.01); *G02B 5/3025* (2013.01); *H10K 59/879* (2023.02); *H10K 59/8791* (2023.02)

(58) Field of Classification Search
CPC ........ G02B 1/11; G02B 1/115; G02B 5/3025; G02B 5/02; G02B 5/0215; G01F 1/133507; G09F 9/00; G02F 1/133606
See application file for complete search history.

(56) References Cited

U.S. PATENT DOCUMENTS 6,950,236 B2  9/2005  Hokazono et al.
9,507,059 B2  11/2016 Shim et al.
(Continued)

FOREIGN PATENT DOCUMENTS

JP  S64-030501 U  2/1989
JP  H07-043704 A  2/1995
(Continued)

OTHER PUBLICATIONS

Chinese Office Action (with English translation) dated May 7, 2024 (Application No. 202080096307.X).
(Continued)

*Primary Examiner* — Ryan D Howard
(74) *Attorney, Agent, or Firm* — BURR PATENT LAW, PLLC

(57) ABSTRACT

An optical film according to an embodiment includes a substrate 101, a surface member 102 provided on a front surface of the substrate 101, and an optical functional layer 103 provided on a back surface of the substrate 101. The optical functional layer 103 includes a low-refractive index layer 104 and a high-refractive index layer 105, and an interface between the low-refractive index layer 104 and the high-refractive index layer 105 has a recessed/protruding shape. The refractive index of the high-refractive index layer (Continued)

105, the refractive index of the substrate 101, and the refractive index of the surface member 102 become smaller in this order.

20 Claims, 11 Drawing Sheets

(56) References Cited

U.S. PATENT DOCUMENTS

| | | | |
|---|---|---|---|
| 9,874,761 B2 | 1/2018 | Van Putten et al. | |
| 2011/0128483 A1 | 6/2011 | Park et al. | |
| 2012/0182506 A1 | 7/2012 | Park et al. | |
| 2016/0187699 A1 | 6/2016 | Ju et al. | |
| 2019/0122597 A1 | 4/2019 | Lee et al. | |
| 2020/0124909 A1 | 4/2020 | Ueba et al. | |
| 2023/0083180 A1 | 3/2023 | Miyashita et al. | |

FOREIGN PATENT DOCUMENTS

| | | | |
|---|---|---|---|
| JP | H07-104280 A | 4/1995 | |
| JP | H09-244010 A | 9/1997 | |
| JP | 3272833 B2 | 4/2002 | |
| JP | 2003-121606 A | 4/2003 | |
| JP | 3621959 B2 | 2/2005 | |
| JP | 2011-054443 A | 3/2011 | |
| JP | 2011-118393 A | 6/2011 | |
| JP | 2012-145944 A | 8/2012 | |
| JP | 2013-092632 A | 5/2013 | |
| JP | 2016-505870 A | 2/2016 | |
| JP | 2016-126350 A | 7/2016 | |
| JP | 2016-200784 A | 12/2016 | |
| JP | 2018-205414 A | 12/2018 | |
| JP | 6447654 B2 | 1/2019 | |
| JP | 2019-056758 A | 4/2019 | |
| JP | 2019-184790 A | 10/2019 | |
| JP | 2020-016881 A | 1/2020 | |
| JP | 2021-128326 A | 9/2021 | |
| KR | 10-2019-0043900 A | 4/2019 | |
| WO | WO-2018194114 A1 * | 10/2018 | ............... F21S 2/00 |

OTHER PUBLICATIONS

Japanese Office Action (Application No. 2021-169742) dated Jul. 23, 2024 (with English translation) (9 pages).
Japanese Office Action (Application No. 2020-157680) dated Jan. 15, 2021 (with English translation).
Japanese Office Action (Application No. 2020-157680) dated May 7, 2021 (with English translation).
Japanese Office Action (Application No. 2020-157680) dated Jul. 16, 2021 (with English translation).
Japanese Decision of Dismissal of Amendment (Application No. 2020-157680) dated Jul. 16, 2021 (with English translation).
Japanese Office Action (Application No. 2020-157680) dated Nov. 9, 2021 (with English translation).
International Search Report and Written Opinion (Application No. PCT/JP2020/042966) dated Jan. 26, 2021 (with English translation).
English translation of the International Preliminary Report on Patentability (Chapter I) dated Aug. 25, 2022 (Application No. PCT/JP2020/042966).
Japanese Office Action (Application No. 2019-124361) dated Mar. 3, 2023 (with English translation).
Korean Office Action (with English translation) dated Feb. 28, 2025 (Application No. 10-2022-7030854).

* cited by examiner

OPTICAL FILM, OPTICAL-FILM-EQUIPPED POLARIZING PLATE, AND DISPLAY DEVICE

TECHNICAL FIELD

The present invention relates to an optical film that produces an optical effect on light emitted from a display surface of a display device. The present invention further relates to an optical-film-equipped polarizing plate and a display device each including the optical film.

BACKGROUND ART

Liquid crystal display devices, each of which is an example of a display device, are used in various fields. Recently, organic LED (organic light emitting diode) display devices are becoming widespread.

In a liquid crystal display device, the color of an image within the viewing angle may change considerably due to a change in intensity of light in accordance with the angle of view, leakage of light in an oblique direction, and the like.

On the other hand, in an organic LED display device, a blue shift tends to occur in an image that is viewed obliquely. The term "blue shift" refers to a phenomenon that an image viewed in an oblique direction looks more bluish than an image viewed in a front view. That is, the color of an image displayed by an organic LED display device may also change considerably within the viewing angle due to, for example, such a blue shift. The blue shift becomes particularly noticeable in an organic-LED display device having a microcavity structure.

The change in color within the viewing angle described above may become a factor that decreases of the display quality of an image. Examples of another factor that affects the display quality include variation in contrast within the viewing angle. To date, various technologies have been proposed in order to improve the display quality of an image. For example, Japanese Unexamined Patent Application Publication No. 7-43704, Japanese Patent No. 3272833, Japanese Patent No. 3621959, Japanese Unexamined Patent Application Publication No. 2016-126350, Japanese Unexamined Patent Application Publication No. 2012-145944, Japanese Unexamined Patent Application Publication No. 2011-118393, and U.S. Pat. No. 9,507,059 each disclose an optical film that is provided on a display surface of a display device in order to improve the display quality of an image.

Usually, an optical film for improving the display quality of an image has a multilayer structure. However, with such a multilayer structure, the energy of light that is released to the outside decreases due to reflection at an interface between layers, reflection at an interface with air layer, and absorption of light in each layer. Therefore, consumption of electric power for obtaining desirable luminance may become undesirably high.

SUMMARY OF INVENTION

The present invention has been made in consideration of the circumstances described above, and an object of the present invention is to provide an optical film that can improve the display quality of an image within the viewing angle while sufficiently suppressing energy loss of light that forms the image, and an optical-film-equipped polarizing plate and a display device each including the optical film.

An optical film according to the present invention includes a substrate, a surface member provided on a front surface of the substrate, and an optical functional layer provided on a back surface of the substrate. The optical functional layer includes a first layer and a second layer that has a refractive index different from a refractive index of the first layer and that is joined to the first layer on the substrate side of the first layer. A first interface between the first layer and the second layer has a recessed/protruding shape. The refractive index of the second layer, a refractive index of the substrate, and a refractive index of the surface member become smaller in this order.

The refractive index of the first layer may be smaller than the refractive index of the second layer.

The refractive index of the first layer may be larger than the refractive index of the second layer.

Each of recessed portions and protruding portions of the recessed/protruding shape may include a flat portion extending along a film surface of the optical film.

The difference between the refractive-index-difference between the second layer and the substrate and the refractive-index-difference between the substrate and the surface member may be 0.2 or less in absolute value, and is preferably 0.1 or less in absolute value.

The refractive index of a surface member may be 1.40 or less, and is preferably 1.37 or less.

The refractive index of the surface member may be 1.37 or less, the refractive index of the substrate may be 1.38 or more and 1.57 or less, and the refractive index of the second layer may be 1.58 or more. Preferably, the refractive index of the surface member is 1.37 or less, the refractive index of the substrate is 1.43 or more and 1.51 or less, and the refractive index of the second layer is 1.58 or more and 1.65 or less.

The refractive index of the surface member may be 1.28 or less, the refractive index of the substrate may be 1.47 or more and 1.54 or less, and the refractive index of the second layer may be 1.6 or more.

The optical functional layer may further include a third layer stacked to a side of the first layer opposite to the second layer, the refractive index of the first layer may be different from a refractive index of the third layer, and a second interface between the first layer and the third layer may have a recessed/protruding shape.

The refractive index of the first layer may be smaller than the refractive index of the third layer.

The refractive index of the first layer may be larger than the refractive index of the third layer.

A pitch of recesses and protrusions of the recessed/protruding shape of the first interface may be larger than a pitch of recesses and protrusions of the recessed/protruding shape of the second interface.

A coloring material may be provided closer to the second layer than to the first interface.

The optical film may further include a colored layer stacked to a side of the second layer of the optical functional layer, and the coloring material may be included in the colored layer.

The coloring material may be included in the colored layer by a proportion of 1.0 mass % or more and 5.0 mass % or less.

The coloring material may have a black color.

In the optical film, the first layer may have adhesiveness.

A display device according to the present invention may include the optical film and a liquid crystal panel, and the optical film may be disposed so that the first layer faces a display surface side of the liquid crystal panel with respect to the second layer.

Another display device according to the present invention may include the optical film and an organic LED panel, and the optical film may be disposed so that the first layer faces a display surface side of the organic LED panel with respect to the second layer.

An optical-film-equipped polarizing plate according to the present invention is an optical-film-equipped polarizing plate including the optical film and a polarizing plate affixed to the optical film.

In the optical-film-equipped polarizing plate, a layer of the optical film in contact with the polarizing plate may also serve as an adhesive layer for the polarizing plate. The optical-film-equipped polarizing plate may further include an adhesive layer between the optical film and the polarizing plate.

An optical-film-equipped polarizing plate according to the present invention may include the optical film, a polarizer affixed to the optical film, and an adhesive layer affixing the optical film and the polarizer to each other. The polarizer may be affixed to the optical film via only the adhesive layer.

Alternatively, an optical-film-equipped polarizing plate according to the present invention may include the optical film and a polarizer affixed to the optical film, a layer of the optical film in contact with the polarizer may also serve as an adhesive layer for the polarizer, and the polarizer may be directly affixed to the optical film.

With the present invention, it is possible to improve the display quality of an image within the viewing angle while sufficiently suppressing energy loss of light that forms the image.

DESCRIPTION OF EMBODIMENTS

Hereafter, embodiments of the present invention will be described with reference to the drawings.

In the present specification, terms such as "sheet", "film", "plate", "layer", and the like should not be discriminated from each other based only by a difference in name. Accordingly, for example, "sheet" is a concept including a member that may be called a film, a plate, or a layer. In the present specification, the term "sheet surface (plate surface, film surface)" refers to a surface a sheet-shaped member that corresponds to the in-plane direction (surface direction) of the sheet-shaped member when the sheet-shaped member is viewed as a whole and globally. Moreover, in the present specification, "normal direction" of a sheet-shaped member refers to the normal direction of the sheet surface of the sheet-shaped member.

First Embodiment

Figure 1:
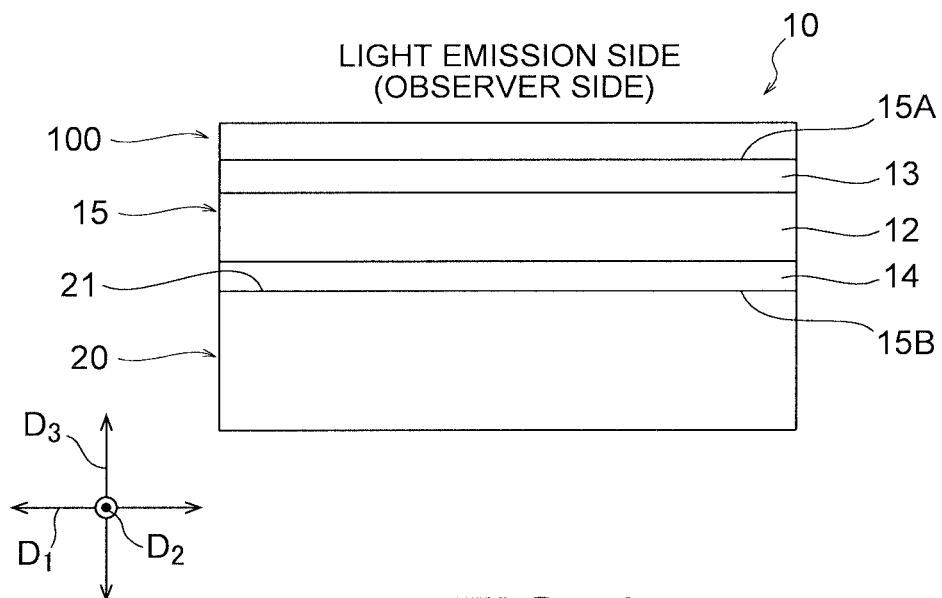
FIG. 1 is a schematic view illustrating the configuration of a display device including an optical film according to a first embodiment of the present invention.
Figure 2:
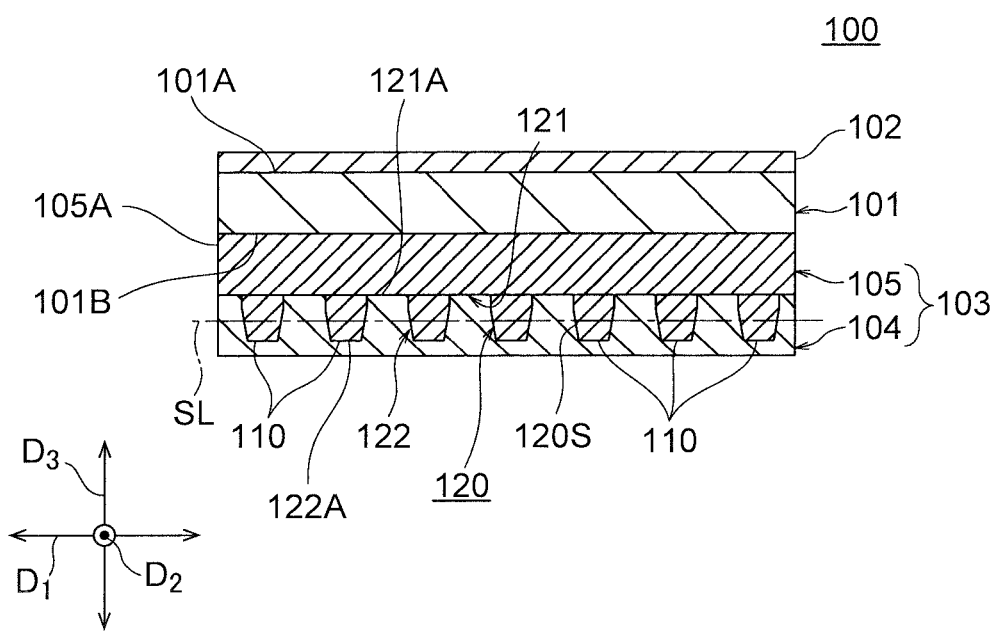
FIG. 2 is an enlarged sectional view of the optical film provided in the display device illustrated in FIG. 1.

FIG. 1 is a schematic view illustrating the configuration of a display device 10 including an optical film 100 according to a first embodiment of the present invention. FIG. 2 is an enlarged sectional view of the optical film 100. The display device 10 illustrated in FIG. 1 is a liquid crystal display device, and is configured by stacking a surface illuminant device 20, a liquid crystal panel 15, and the optical film 100 in this order. The display device 10 according to the present embodiment is configured as, for example, a TV set. However, the display device 10 may be a tablet terminal, a smartphone, a computer display, a car navigation system, or the like.

In FIG. 1 and other figures used in the following description, a symbol $D_1$ denotes a first direction that is a direction in which the film surface of the optical film 100 extends. A symbol $D_2$ denotes a second direction that is a direction in which the film surface of the optical film 100 extends and that is perpendicular to the first direction $D_1$. A symbol D3 denotes a third direction that is perpendicular to the first direction $D_1$ and the second direction $D_2$.

Although details will be described below, as illustrated in FIG. 2, the optical film 100 according to the present embodiment includes a plurality of lens portions 110 that are arranged at intervals, and each of the lens portions 110 extends in a direction perpendicular to the arrangement direction in an elongated shape. In the present embodiment, the arrangement direction of the lens portions 110 coincides with the first direction $D_1$, and the longitudinal direction of the lens portions 110 coincides with the second direction $D_2$. The first direction $D_1$ and the second direction $D_2$ may coincide with but need not coincide with the column direction and the row direction of pixel regions that are arranged in the liquid crystal panel 15. When suppression of moire is considered, in general, the first direction $D_1$ and the second direction $D_2$ are determined so that these directions do not coincide with the column direction and the row direction of the pixel regions that are arranged in a matrix pattern.

(Liquid Crystal Panel)

The liquid crystal panel 15 has a display surface 15A that displays an image that is a still image or a moving image (hereafter, referred to as an "image") and a back surface 15B that is disposed opposite the display surface 15A. With the display device 10, the liquid crystal panel 15 functions as a shutter that controls transmission or blocking of light from the surface illuminant device 20 for each region (subpixel) that forms a pixel, and an image is displayed on the display surface 15A as the liquid crystal panel 15 is driven.

The illustrated liquid crystal panel 15 includes an upper polarizing plate 13 disposed on the light-emission side, a lower polarizing plate 14 disposed on the light-incident side, and a liquid crystal layer 12 disposed between the upper polarizing plate 13 and the lower polarizing plate 14. The polarizing plates 14 and 13 have the function of: splitting incident light into two polarized components (for example, a p-wave and an s-wave); transmitting a linear polarized component (for example, a p-wave) that oscillates in one direction (direction in which the transmission axis extends); and absorbing a linear polarized component (for example, an s-wave) that oscillates in another direction perpendicular to the one direction.

In the liquid crystal layer 12, a voltage can be applied to each region that forms one pixel, and the orientations of liquid crystal molecules in the liquid crystal layer 12 change depending on whether or not a voltage is applied. As an example, a polarized component in a specific direction that has been transmitted through the lower polarizing plate 14, which is disposed on the light-incident side, rotates the polarization direction thereof by 90° while passing through the liquid crystal layer 12 to which a voltage is not applied. On the other hand, the polarized component maintains the polarization direction thereof while passing through the liquid crystal layer 12 to which a voltage is applied. In this case, by applying or not applying a voltage to the liquid crystal layer 12, it is possible to control whether the polarized component that has been transmitted through the lower polarizing plate 14 and that oscillates in the specific direction is further transmitted through the upper polarizing plate 13 disposed on the light-emission side of the lower polarizing plate 14 or is blocked by being absorbed by the upper polarizing plate 13. In this way, with the liquid crystal panel 15, it is possible to control transmission of light from the surface illuminant device 20 for each region that forms a pixel.

In the present embodiment, the liquid crystal panel 15 is, as an example, a VA (vertical alignment) liquid crystal panel. Accordingly, when a voltage applied to liquid crystal molecules in the liquid crystal layer 12 is off or has a minimum value, the liquid crystal molecules are oriented in the normal direction of the display surface 15A, and the liquid crystal panel 15 is in a state in which light from the surface illuminant device 20 is blocked. The liquid crystal panel 15 is configured to gradually increase the transmittance of light from the surface illuminant device 20 by gradually increasing the voltage to the liquid crystal molecules and gradually inclining the liquid crystal molecules toward a side along the display surface 15A. The liquid crystal panel 15 is not limited to a VA panel, may be a TN (twisted nematic) liquid crystal panel, or may be an IPS (in-plane switching) liquid crystal panel.

(Surface Illuminant Device)

The surface illuminant device 20 has a light emitting surface 21 that emits light in a planar manner, and is used as a device that illuminates the liquid crystal panel 15 from the back surface 15B side. The surface illuminant device 20 is a surface illuminant device of an edge-light type as an example, but may be of a direct-lighting type or of a backside-illumination type.

(Optical Film)

The optical film 100 is disposed on the display surface 15A of the liquid crystal panel 15, and, to be specific, is joined to the display surface 15A. Referring to FIG. 2, the optical film 100 includes a sheet-shaped or film-shaped substrate 101 having a front surface 101A and a back surface 101B on the opposite side, a sheet-shaped or film-shaped surface member 102 provided on the front surface 101A of the substrate 101, and a sheet-shaped or film-shaped optical functional layer 103 provided on the back surface 101B of the substrate 101. The optical functional layer 103 includes a low-refractive index layer 104 corresponding to a first layer and a high-refractive index layer 105 corresponding to a second layer.

The substrate 101 is a transparent substrate made of a resin, glass, or the like and having optical transparency. The material of the substrate 101 may be, for example, polyethylene terephthalate, polyolefin, polycarbonate, polyacrylate, polyamide, glass, triacetyl cellulose, polyimide, polyethylene naphthalate, or the like. The refractive index of the substrate 101 is preferably in the range of 1.38 or more and 1.57 or less, and more preferably 1.47 or more and 1.54 or less. The thickness of the substrate 101 is preferably 5 μm or more 120 μm or less. In view of ease of handling and the like, the lower limit of the thickness of the substrate 101 is preferably 15 μm or more, and more preferably 25 μm or more. In view of reduction in thickness, the upper limit of the thickness of the substrate 101 is preferably 150 μm or less. The substrate 101 is preferably colorless and transparent. The total light transmittance of the substrate 101 is preferably 87% or more, and more preferably 90% or more.

The optical functional layer 103 includes the low-refractive index layer 104 and the high-refractive index layer 105 as described above. The refractive index of the low-refractive index layer 104 is lower than the refractive index of the high-refractive index layer 105, and the high-refractive index layer 105 is joined to the low-refractive index layer 104 on the substrate 101 side of the low-refractive index layer 104. The high-refractive index layer 105 has the plurality of lens portions 110 on a surface thereof opposite to the substrate 101 side. The lens portions 110 are formed to protrude in the normal direction of the high-refractive index layer 105, that is, to protrude toward the low-refractive index layer 104 side in the third direction D3. That is, the high-refractive index layer 105 includes a film-shaped layer body 105A, which has a front surface facing the substrate 101 side and a back surface opposite to the front surface, and the plurality of lens portions 110 that are integrated with and arranged on the back surface of the layer body 105A. In contrast, the low-refractive index layer 104 is stacked on the high-refractive index layer 105 to cover the lens portions 110 and so that the spaces between the plurality of lens portions 110 are filled therewith. Thus, in the present embodiment, the interface between the low-refractive index layer 104 and the high-refractive index layer 105 has a recessed/protruding shape 120. The optical film 100 is disposed so that the low-refractive index layer 104 faces the display surface 15A side of the liquid crystal panel 15 with respect to the high-refractive index layer 105.

One recessed portion 121 and one protruding portion 122 form the shape of one cycle, and the recessed/protruding shape 120 is configured by repeatedly forming the shape of one cycle. In the present embodiment, with respect to a reference line SL that passes through a midpoint between the bottom part of the recessed portion 121 and the top part of the protruding portion 122 and that extends in the film surface direction of the optical film 100, a portion that is recessed toward the high-refractive index layer 105 side corresponds to the recessed portion 121, and a portion that protrudes toward the low-refractive index layer 104 side corresponds the protruding portion 122. In the present embodiment, the recessed portions 121 and the protruding portions 122 are both arranged in the first direction $D_1$ and linearly extend in the second direction $D_2$ perpendicular to the first direction $D_1$.

The recessed portion 121 and the protruding portion 122 of the present embodiment respectively include flat portions 121A and 122A that extend along the film surface of the optical film 100. To be specific, the bottom part of the recessed portion 121 is the flat portion 121A, and the top part of the protruding portion 122 is the flat portion 122A. A side surface 120S of the recessed/protruding shape 120, which extends between the flat portion 121A of the recessed portion 121 and the flat portion 122A of the protruding portion 122, is a curved surface that is convex toward the low-refractive index layer 104 side. The side surface 120S is formed so as not to cross a straight line that extends in the film surface direction from an end point of the flat portion 121A to which the side surface 120S is connected. Thus, it is possible to demold the high-refractive index layer 105 having the lens portion 110 that forms the side surface 120S.

In the present embodiment, the side surface 120S is a curved surface. However, the side surface 120S may be a bent surface (polygonal surface) that is convex toward the low-refractive index layer 104 side. When formed as a curved surface, the side surface 120S may be formed along a circular arc or may be formed along an elliptical arc. The side surface 120S may be a bent surface that is concave toward the high-refractive index layer 105 side or may be a flat surface.

The recessed/protruding shape 120 described above improves the display quality of an image displayed on the display surface 15A by producing optical effects, such as total reflection, refraction, and transmittance, on light emitted from the display surface 15A to form the image. In the present embodiment, two side surfaces 120S that are adjacent to each other form a tapered shape that tapers in a direction in which the recessed portion 121 is recessed or in a direction in which the protruding portion 122 protrudes. In other words, the side surfaces 120S that are adjacent to each other with the flat portion 121A of the recessed portion 121 therebetween form a tapered shape that tapers from the low-refractive index layer 104 side toward the high-refractive index layer 105 side, and the side surfaces 120S that are adjacent to each other with the flat portion 122A of the protruding portion 122 therebetween forms a tapered shape that tapers from the high-refractive index layer 105 side toward the low-refractive index layer 104 side. With such a shape, optical effects for improving the display quality of an image displayed on the display surface 15A are produced. When the side surface 120S is a curved surface or a polygonal surface that is convex toward the low-refractive index layer 104 side as in the present embodiment, it is possible to particularly effectively suppress change in color in the viewing angle.

In the present embodiment, the low-refractive index layer 104 and the high-refractive index layer 105 are selected so that the difference between the refractive index of the low-refractive index layer 104 and the refractive index of the high-refractive index layer 105 is 0.05 or more and 0.60 or less. The difference between the refractive index of the low-refractive index layer 104 and the refractive index of the high-refractive index layer 105 is preferably 0.05 or more and 0.50 or less, and more preferably 0.10 or more and 0.20 or less. The refractive index of the low-refractive index layer 104 is, for example, 1.40 or more and 1.55 or less. The refractive index of the high-refractive index layer 105 is, for example, 1.55 or more and 1.90 or less, and is larger than the refractive index of the low-refractive index layer 104.

The low-refractive index layer 104 may be formed, for example, by curing a UV-curable resin, an electron-beam-curable resin, or a thermosetting resin. When the low-refractive index layer 104 is formed by curing a UV-curable resin, the UV-curable resin may include an acrylic resin or may include an epoxy resin. Likewise, the high-refractive index layer 105 may be formed, for example, by curing a UV-curable resin, an electron-beam-curable resin, or a thermosetting resin. When the high-refractive index layer 105 is formed by curing a UV-curable resin, the UV-curable resin may include an acrylic resin or may include an epoxy resin. The low-refractive index layer 104 may be an adhesive such as an acrylic adhesive.

The thickness of the layer body 105A of the high-refractive index layer 105 in the third direction D3 is, for example, 0.5 µm or more and 30 µm or less. The height of the lens portions 110 is, for example, 1.0 µm or more and 30 µm or less. On the other hand, the thickness of the low-refractive index layer 104 is 5 µm or more and 100 µm or less.

In the present embodiment, the high-refractive index layer 105 is directly joined to the substrate 101. On the other hand, the optical film 100 may have a flat layer between the high-refractive index layer 105 and the substrate 101, and the high-refractive index layer 105 and the substrate 101 may be joined via the flat layer. The flat layer is a layer for stabilizing the state in which the high-refractive index layer 105 and the substrate 101 are joined. The flat layer is made of a transparent material having optical transparency. In particular, in the present embodiment, the flat layer is made of a material that can transmit visible light and ultraviolet rays, and may include, for example, a polyester resin, a vinyl-chloride/vinyl-acetate resin, a urethane resin, or the like as a main component. The term "main component" refers to a component of a substance that is included in the substance by 50 mass % or more or a component of a substance that is included in the substance by the highest proportion. The flat layer is formed, for example, by drying a solution of a polyester resin, a vinyl-chloride/vinyl-acetate resin, or a urethane resin. The thickness of the flat layer is, for example, 1 µm or more and 20 µm or less. The refractive index of the flat layer is, for example, 1.46 or more and 1.67 or less. Preferably, the refractive index of the flat layer is the same as the refractive index of the high-refractive index layer 105, the difference between the refractive index of the high-refractive index layer 105 and the refractive index of the flat layer is 0.08 or less, the refractive index of the flat layer is the same as the refractive index of the substrate 101, the difference between the refractive index of the flat layer and the refractive index of the substrate 101 is 0.08 or less, the refractive index of the flat layer is the average value M of the refractive index of the high-refractive index layer 105 and the refractive index of the substrate 101, or the refractive index of the flat layer is in the range of 0.98M to 1.02M.

When a layer that is in contact with the upper polarizing plate 13 of the optical film 100, which is the low-refractive index layer 104 here, is an adhesive layer, the low-refractive index layer 104 is directly joined to the display surface 15A of the liquid crystal panel 15, to be more specific, to the front surface of the upper polarizing plate 13. The low-refractive index layer 104 may be joined to the front surface of the upper polarizing plate 13 via an adhesive layer provided between the low-refractive index layer 104 and the display surface 15A of the liquid crystal panel 15, that is, the front surface of the upper polarizing plate 13.

On the other hand, the surface member 102 is a portion that configures the foremost surface of the optical film 100, and configures the foremost surface of the display device 10 when the optical film 100 is incorporated in the display device 10. The surface member 102 basically functions as a protective layer, while the refractive index thereof is set to be 1.40 or less. Having such a low refractive index, the surface member 102 can improve the light emission efficiency with which light is emitted from the optical film 100 to the outside.

Improvement of performance in emitting light to the outside due to the surface member 102 is realized by setting the refractive index of the surface member 102 to a low value that is 1.40 or less. When the refractive index of the surface member 102 has a low value, the critical angle, which is an angle at which light to be emitted to the outside from the liquid crystal panel 15 side starts to be totally reflected by the interface between the surface member 102 and air, is large. Thus, the light emission amount increases, and undesirable decrease of luminance within the viewing angle is suppressed.

When the refractive index of the surface member 102 is 1.40 or less, the critical angle at the interface between the surface member 102 and air is 45.56 degrees or more. To be more specific, the critical angle is 47.3 degrees when the refractive index is 1.36, the critical angle is 49.2 degree when the refractive index is 1.32, the critical angle is 51.26 degrees when the refractive index is 1.28, and the critical angle is 52.52 degrees when the refractive index is 1.26. That is, as the refractive index of the surface member 102 decreases, the performance in emission of light to the outside improves. When the refractive index of the surface member 102 is low, because it is easy for external light to become incident on the surface member 102, it is also possible to improve antireflection performance against external light and to improve viewability.

The structure and the material of the surface member 102 are not particularly limited. Examples of the structure of the surface member 102 include: a low-refractive-index single layer structure; a dielectric multilayer structure of two layers, three layers, or the like; and a hollow-particle or porous structure.

When the structure of the surface member 102 is a low-refractive-index single layer structure, needless to say, the refractive index of the single layer is the refractive index of the surface member 102. When the structure of the surface member 102 is a low-refractive-index single layer structure, the refractive index can be obtained, for example, by fitting a reflection spectrum measured by using a spectrophotometer with a spectrum calculated from a thin-film optical model using Fresnel's formula. The refractive index may be measured by using an Abbe refractometer (NAR-4T made by ATAGO Co.) or an ellipsometer.

The refractive index of the surface member 102 can be measured through the following process.

That is, a sample in a powder state is made by scraping off the surface member 102 by using a cutter or the like, and Becke's method compliant with JIS K 7142 (2008) B method (for a transparent material in a powder state or a particle state) is used (a Cargille reagent having a known refractive index is used, and the sample in a powder state in placed on a slide glass. The reagent is dropped onto the sample to immerse the sample in the reagent. The sample immersed in the reagent is observed by using a microscope, and the refractive index of the reagent when an emission line (Becke's line), which is generated at the outline of the sample due to the difference between the refractive indices of the sample and the reagent, becomes visually unobservable is determined as the refractive index of the sample).

When the structure of the surface member 102 is a low-refractive-index single layer structure, the thickness of the surface member 102 is preferably 0.07 µm or more and 0.12 µm or less. In view of prevention of reflection, the thickness of the surface member 102 is desirably as small as possible, and is preferably 0.075 µm or more and 0.11 µm or less. Examples of the material of the surface member 102 having a low-refractive-index single layer structure include magnesium fluoride, an acrylic resin, and the like.

When the structure of the surface member 102 is a dielectric multilayer structure of two layers, three layers, or the like, in the present embodiment, the refractive index of a layer having the lowest refractive index is obtained as the refractive index of the surface member 102. In the dielectric multilayer structure, a plurality of layers having different refractive indices are stacked. The refractive index can be obtained by identifying the refractive index of a layer having the lowest refractive index by, for example, fitting a reflection spectrum measured by using a spectrophotometer with a spectrum calculated from a thin-film optical model using Fresnel's formula. The refractive index of a layer having the lowest refractive index may be measured by using an Abbe refractometer (NAR-4T made by ATAGO Co.) or an ellipsometer.

The refractive index of the surface member 102 can be measured through the following process.

That is, a sample in a powder state is made by scraping off a layer of the surface member 102 having the lowest refractive index by using a cutter or the like, and Becke's method compliant with JIS K 7142 (2008) B method (for a transparent material in a powder state or a particle state) is used (a Cargille reagent having a known refractive index is used, and the sample in a powder state in placed on a slide glass. The reagent is dropped onto the sample to immerse the sample in the reagent. The sample immersed in the reagent is observed by using a microscope, and the refractive index of the reagent when an emission line (Becke's line), which is generated at the outline of the sample due to the difference between the refractive indices of the sample and the reagent, becomes visually unobservable is determined as the refractive index of the sample).

When the structure of the surface member 102 is dielectric multilayer structure, the thickness of the surface member 102 is preferably 0.1 µm or more and 1.4 µm or less. In view of prevention of reflection, the thickness of the surface member is desirably as small as possible, and, when the structure of the surface member 102 is dielectric multilayer structure, the thickness is preferably 0.1 µm or more and 1.2 µm or less.

Regarding the material of the surface member 102 having a dielectric multilayer structure of three layers, in general, relationships nA<nB and nB>nC are satisfied, where nA, nB, and nC are the refractive indices of a first layer, a second layer, and a third layer that are stacked from the inside toward the outside.

When the structure of the surface member 102 is a hollow-particle or porous structure, the surface member 102 may include, for example, hollow silica microparticles and a base resin that holds the hollow silica microparticles, or the surface member 102 may be formed of, for example, a porous thin film having a plurality of air holes that can be formed by using a sol-gel process. The refractive index of the surface member 102 having a hollow-particle or porous structure can be identified from an average refractive index. The average refractive index can be calculated by: identifying the occupancy ratio of air portions and the occupancy ratio of the other portions by using, for example, a SEM image or the like; and adding the product of 1, which is the refractive index of air, and the occupancy ratio of the air portions and the product of the refractive index of the other portions and the occupancy ratio of the other portions.

When the structure of the surface member 102 is a hollow-particle or porous structure, the thickness of the surface member 102 is preferably 0.1 µm or more and 14 µm or less. In view of prevention of reflection, the thickness of the surface member is desirably as small as possible, and is preferably 0.1 µm or more and 12 µm or less.

When the surface member 102 includes hollow silica microparticles and a base resin that holds the hollow silica microparticles, the base resin may be, for example, a (meth) acrylic resin. When the surface member 102 has a porous structure, the material thereof may be a resin having a low refractive index, such as a fluorocarbon resin or organopolysiloxane. When the structure of the surface member 102 is a hollow-particle or porous structure, the surface member 102 may have a single layer, or may include a layer of hollow-particles or a porous structure and another layer (such as a hard layer or a high-refractive index layer).

<Relationships Between Refractive Indices in Optical Film>

Next, the relationship between the refractive indices of a plurality of layers of the optical film 100 will be described.

In the present embodiment, the refractive indices of the layers of the optical functional layer 103 are set so that the refractive index of the high-refractive index layer 105, the refractive index of the substrate 101, and the refractive index of the surface member 102 become smaller in this order. As a result of intensive research, the inventors have found that light can be efficiently emitted to the outside when the refractive indices of the high-refractive index layer 105, the substrate 101, and the surface member 102, which are arranged in a direction in which the light is emitted, gradually become smaller toward the outside.

When the refractive index of the high-refractive index layer 105, the refractive index the substrate 101, and the refractive index of the surface member 102 become smaller in this order as described above, preferably, the refractive index of the high-refractive index layer 105, the refractive index of the substrate 101, and the refractive index of the surface member 102 are changed at the same ratio or changed gradually, in view of improvement of light emission performance. To be specific, the difference between the refractive-index-difference between the high-refractive index layer 105 and the substrate 101 and the refractive-index-difference between the substrate 101 and the surface member 102 is, in absolute value, preferably 0.2 or less, in particular, 0.1 or less, more preferably 0.05 or less, further preferably 0.02 or less, and still further preferably 0.

In the case where the refractive index of the high-refractive index layer 105, the refractive index of the substrate 101, and the refractive index of the surface member 102 become smaller in this order as described above, it is possible to visually check that light can be more easily transmitted than in: (1) comparative configuration 1: a case where the refractive index of the high-refractive index layer 105 is higher the refractive index of the substrate 101, and the refractive index of the substrate 101 is lower than the refractive index of the surface member 102; and (2) comparative configuration 2: a case where the refractive index of the high-refractive index layer 105 is lower than the refractive index of the substrate 101, and the refractive index of the substrate 101 is higher than the refractive index of the surface member 102.

To be specific, when a case where an image from the liquid crystal panel 15 is observed through the optical film 100 according to the embodiment disposed on the liquid crystal panel 15 is compared with a case where the same image is observed through an optical film according to the comparative configuration 1 or the comparative configuration 2, it is possible to visually check easily that the former case is brighter than the latter case when seen in the entire viewing angle.

Moreover, by calculating the energy transmittances of a p-wave and an s-wave of light, it is also possible to check that the light emission amount increases by setting the refractive indices of the layers as described above.

Figure 3:
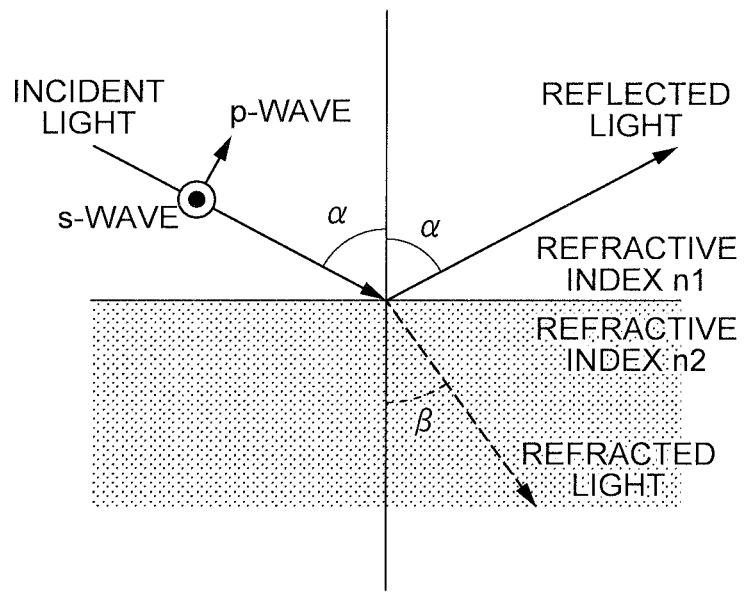
FIG. 3 illustrates a method of calculating the energy transmittance of light that is transmitted through a multilayer structure.

FIG. 3 illustrates a method of calculating the energy transmittance of light that is transmitted through a multilayer structure. FIG. 3 illustrates a state in which a part of light having an incident angle α is incident from a layer of refractive index n1 to a layer of refractive index n2 and the remaining part of the light is reflected. The reflection angle of the reflected light is the same as the incident angle α. The light that is incident on the layer of refractive index n2 travels at a refraction angle β.

When light is reflected as described above, the amplitude transmittance tp of p-wave light and the amplitude transmittance is of s-wave light are represented by the following formulas (1) and (2).

[Math 1]

$$t_p = \frac{2\sin\beta\cos\alpha}{\sin(\alpha+\beta)\cos(\alpha-\beta)} \quad (1)$$

-continued $$t_s = \frac{2\sin\beta\cos\alpha}{\sin(\alpha+\beta)} \quad (2)$$

The relationship between the incident angle α and the angle of refraction angle β is represented by the following formula (3) based on Snell's law.

[Math 2]

$$n_1 \sin \alpha = n_2 \sin \beta \quad (3)$$

Because the energy of light is proportional to the square of the amplitude of the electric field, the energy transmittance of light can be obtained as the square of the amplitude transmittance. However, at this time, it is necessary to consider the refractive-index-difference between two layers as a coefficient. Based on such relationships, the energy transmittance Tp of p-wave light and the energy transmittance Ts of s-wave light can be represented by the following formulas (4) and (5) by using the formulas (1) to (3).

[Math 3]

$$T_p = \frac{\tan\alpha}{\tan\beta} t_p^2 \quad (4)$$

$$T_s = \frac{\tan\alpha}{\tan\beta} t_s^2 \quad (5)$$

In the optical film 100 according to the present embodiment, the low-refractive index layer 104, the high-refractive index layer 105, the substrate 101, and the surface member 102 are stacked in this order. In this case, the energy transmittance of light of the optical film 100 can be calculated by obtaining each of the energy transmittance between the low-refractive index layer 104 and the high-refractive index layer 105, the energy transmittance between the high-refractive index layer 105 and the substrate 101, the energy transmittance between the substrate 101 and the surface member 102, and the energy transmittance between the surface member 102 and air, and by multiplying all of these.

Figure 4:
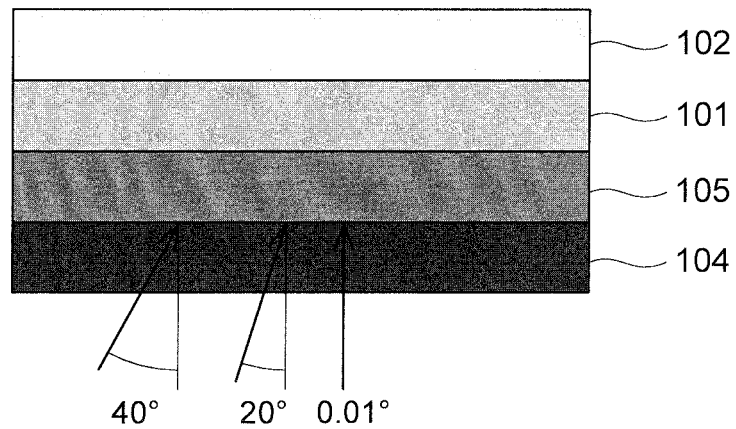
FIG. 4 illustrates light that is transmitted through the display device illustrated in FIG. 1 and whose energy transmittance is calculated.

In Calculation Examples 1 to 9 described below, the calculation results of the energy transmittance of the optical film 100 according to the embodiment under various conditions and the calculation results of the energy transmittances of optical films according to the comparative configurations 1 and 2 are shown. In Calculation Examples 10 to 15 and Calculation Example 16 to 20, the calculation results of the energy transmittance of the optical film 100 according to the embodiment under conditions that differ from those of Calculation Examples 1 to 9 are shown. In the following calculation results, in light that is transmitted through the inside of the display device, the energy transmittance of light that is incident on the high-refractive index layer 105 from the low-refractive index layer 104 at each of angles of incidence of 0.01 degrees, 20 degrees, and 40 degrees is calculated. FIG. 4 illustrates light whose energy transmittance is calculated.

CALCULATION EXAMPLE 1

In Calculation Example 1, in the optical film 100 according to the present embodiment, the refractive index of the low-refractive index layer 104 is 1.48, the refractive index of the high-refractive index layer 105 is 1.65, the refractive index of the substrate 101 is 1.49, the refractive index of the surface member 102 is 1.40, and the refractive index of air is 1.

In the comparative configuration 1, the refractive index of the low-refractive index layer 104 is 1.48, the refractive index of the high-refractive index layer 105 is 1.65, the refractive index of the substrate 101 is 1.35, the refractive index of the surface member 102 is 1.40, and the refractive index of air is 1.

In the comparative configuration 2, the refractive index of the low-refractive index layer 104 is 1.48, the refractive index of the high-refractive index layer 105 is 1.65, the refractive index of the substrate 101 is 1.87, the refractive index of the surface member 102 is 1.40, and the refractive index of air is 1.

TABLE 1

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.40 | 1.40 | 1.40 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 96.6% | 95.9% | 94.6% |
| Energy Transmittance of p-wave at Incident Angle of 20 degrees | 97.9% | 97.4% | 96.2% |
| Energy Transmittance of p-wave at Incident Angle of 40 degrees | 93.2% | 93.1% | 92.7% |
| Energy Transmittance of s-wave at Incident Angle of 0.01 degrees | 96.6% | 95.9% | 94.6% |
| Energy Transmittance of s-wave at Incident Angle of 20 degrees | 95.0% | 94.2% | 92.6% |
| Energy Transmittance of s-wave at Incident Angle of 40 degrees | 69.8% | 68.4% | 66.5% |

As shown in Table 1, in the optical film 100 according to the embodiment, the energy transmittance Tp of p-wave light and the energy transmittance Ts of s-wave light are both high, compared with those in the comparative configurations 1 and 2. In particular, the energy transmittance Ts of s-wave light at the incident angle of 40 degrees is noticeably higher than those in the comparative configurations 1 and 2.

CALCULATION EXAMPLE 2

Calculation Example 2 differs from Calculation Example 1 in that the refractive index of the surface member in each of the embodiment and the comparative configurations 1 and 2 is 1.38. Table 2 shows the calculation results of energy transmittances in Calculation Example 2.

TABLE 2

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.38 | 1.38 | 1.38 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 96.8% | 96.2% | 94.6% |
| Energy Transmittance of p-wave at Incident Angle of 20 degrees | 98.0% | 97.5% | 96.2% |
| Energy Transmittance of p-wave at Incident Angle of 40 degrees | 93.1% | 93.1% | 92.7% |
| Energy Transmittance of s-wave at Incident Angle of 0.01 degrees | 96.8% | 96.2% | 94.6% |
| Energy Transmittance of s-wave at Incident Angle of 20 degrees | 95.3% | 94.6% | 92.7% |
| Energy Transmittance of s-wave at Incident Angle of 40 degrees | 70.7% | 69.4% | 67.1% |

As shown in Table 2, in the optical film 100 according to the embodiment, the energy transmittance Tp of p-wave light and the energy transmittance Ts of s-wave light are both high, compared with those in the comparative configurations 1 and 2.

CALCULATION EXAMPLE 3

Calculation Example 3 differs from Calculation Example 1 in that the refractive index of the surface member in each of the embodiment and the comparative configurations 1 and 2 is 1.36. Table 3 shows the calculation results of energy transmittances in Calculation Example 3.

TABLE 3

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.36 | 1.36 | 1.36 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 96.9% | 96.4% | 94.6% |

TABLE 3-continued

|  | Optical Film of Embodiment | Optical Film of Comparative Configuration 1 | Optical Film of Comparative Configuration 2 |
|---|---|---|---|
| Energy Transmittance of p-wave at Incident Angle of 20 degrees | 98.1% | 97.7% | 96.2% |
| Energy Transmittance of p-wave at Incident Angle of 40 degrees | 93.1% | 93.1% | 92.6% |
| Energy Transmittance of s-wave at Incident Angle of 0.01 degrees | 96.9% | 96.4% | 94.6% |
| Energy Transmittance of s-wave at Incident Angle of 20 degrees | 95.5% | 94.9% | 92.7% |
| Energy Transmittance of s-wave at Incident Angle of 40 degrees | 71.6% | 70.5% | 67.6% |

As shown in Table 3, in the optical film 100 according to the embodiment, the energy transmittance Tp of p-wave light and the energy transmittance Ts of s-wave light are both high, compared with those in the comparative configurations 1 and 2.

CALCULATION EXAMPLE 4

Calculation Example 4 differs from Calculation Example 1 in that the refractive index of the surface member in each of the embodiment and the comparative configurations 1 and 2 is 1.34. Table 4 shows the calculation results of energy transmittances in Calculation Example 4.

TABLE 4

|  | Optical Film of Embodiment | Optical Film of Comparative Configuration 1 | Optical Film of Comparative Configuration 2 |
|---|---|---|---|
| Refractive Index of Air Layer | 1.00 | 1.00 | 1.00 |
| Refractive Index of Surface Material | 1.34 | 1.34 | 1.34 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 97.1% | 96.6% | 94.6% |
| Energy Transmittance of p-wave at Incident Tingle of 20 degrees | 98.2% | 97.8% | 96.1% |
| Energy Transmittance of p-wave at Incident Angle of 40 degrees | 93.1% | 93.1% | 92.6% |
| Energy Transmittance of s-wave at Incident Angle of 0.01 degrees | 97.1% | 96.6% | 94.6% |
| Energy Transmittance of s-wave at Incident Angle of 20 degrees | 95.7% | 95.2% | 92.7% |
| Energy Transmittance of s-wave at Incident Angle of 40 degrees | 72.5% | 71.6% | 68.1% |

As shown in Table 4, in the optical film 100 according to the embodiment, the energy transmittance Tp of p-wave light and the energy transmittance Ts of s-wave light are both high, compared with those in the comparative configurations 1 and 2.

CALCULATION EXAMPLE 5

Calculation Example 5 differs from Calculation Example 1 in that the refractive index of the surface member in each of the embodiment and the comparative configurations 1 and 2 is 1.32. Table 5 shows the calculation results of energy transmittances in Calculation Example 5.

TABLE 5

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.32 | 1.32 | 1.32 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 97.2% | 96.8% | 94.5% |
| Energy Transmittance of p-wave at Incident Angle of 20 degrees | 98.2% | 97.9% | 96.1% |
| Energy Transmittance of p-wave at Incident Angle of 40 degrees | 93.1% | 93.1% | 92.6% |
| Energy Transmittance of s-wave at Incident Angle of 0.01 degrees | 97.2% | 96.8% | 94.5% |
| Energy Transmittance of s-wave at Incident Angle of 20 degrees | 95.9% | 95.5% | 92.7% |
| Energy Transmittance of s-wave at Incident Angle of 40 degrees | 73.4% | 72.6% | 68.6% |

As shown in Table 5, in the optical film 100 according to the embodiment, the energy transmittance Tp of p-wave light and the energy transmittance Ts of s-wave light are both high, compared with those in the comparative configurations 1 and 2.

CALCULATION EXAMPLE 6

Calculation Example 6 differs from Calculation Example 1 in that the refractive index of the surface member in each of the embodiment and the comparative configurations 1 and 2 is 1.30. Table 6 shows the calculation results of energy transmittances in Calculation Example 6.

TABLE 6

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.30 | 1.30 | 1.30 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 97.3% | 97.0% | 94.5% |
| Energy Transmittance of p-wave at Incident Angle of 20 degrees | 98.3% | 98.0% | 96.0% |

TABLE 6-continued

|  | Optical Film of Embodiment | Optical Film of Comparative Configuration 1 | Optical Film of Comparative Configuration 2 |
|---|---|---|---|
| Energy Transmittance of p-wave at Incident Angle of 40 degrees | 93.2% | 93.1% | 92.7% |
| Energy Transmittance of s-wave at Incident Angle of 0.01 degrees | 97.3% | 97.0% | 94.5% |
| Energy Transmittance of s-wave at Incident Angle of 20 degrees | 96.1% | 95.7% | 92.6% |
| Energy Transmittance of s-wave at Incident Angle of 40 degrees | 74.3% | 73.7% | 69.1% |

As shown in Table 6, in the optical film 100 according to the embodiment, the energy transmittance Tp of p-wave light and the energy transmittance Ts of s-wave light are both high, compared with those in the comparative configurations 1 and 2.

CALCULATION EXAMPLE 7

Calculation Example 7 differs from Calculation Example 1 in that the refractive index of the surface member in each of the embodiment and the comparative configurations 1 and 2 is 1.28. Table 7 shows the calculation results of energy transmittances in Calculation Example 7.

TABLE 7

|  | Optical Film of Embodiment | Optical Film of Comparative Configuration 1 | Optical Film of Comparative Configuration 2 |
|---|---|---|---|
| Refractive Index of Air Layer | 1.00 | 1.00 | 1.00 |
| Refractive Index of Surface Material | 1.28 | 1.28 | 1.28 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 97.4% | 97.2% | 94.4% |
| Energy Transmittance of p-wave at Incident Angle of 20 degrees | 98.3% | 98.1% | 95.9% |
| Energy Transmittance of p-wave at Incident Angle of 40 degrees | 93.2% | 93.2% | 92.8% |
| Energy Transmittance of s-wave at Incident Angle of 0.01 degrees | 97.4% | 97.2% | 94.4% |
| Energy Transmittance of s-wave at Incident Angle of 20 degrees | 96.2% | 95.9% | 92.6% |
| Energy Transmittance of s-wave at Incident Angle of 40 degrees | 75.1% | 74.8% | 69.5% |

As shown in Table 7, in the optical film 100 according to the embodiment, the energy transmittance Tp of p-wave light and the energy transmittance Ts of s-wave light are both high, compared with those in the comparative configurations 1 and 2.

CALCULATION EXAMPLE 8

Calculation Example 8 differs from Calculation Example 1 in that the refractive index of the surface member in each of the embodiment and the comparative configurations 1 and 2 is 1.42. Table 8 shows the calculation results of energy transmittances in Calculation Example 8.

TABLE 8

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.42 | 1.42 | 1.42 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 96.4% | 95.7% | 94.5% |
| Energy Transmittance of p-wave at Incident Angle of 20 degrees | 97.7% | 97.2% | 96.2% |
| Energy Transmittance of p-wave at Incident Angle of 40 degrees | 93.2% | 93.2% | 92.8% |
| Energy Transmittance of s-wave at Incident Angle of 0.01 degrees | 96.4% | 95.7% | 94.5% |
| Energy Transmittance of s-wave at Incident Angle of 20 degrees | 94.8% | 93.9% | 92.5% |
| Energy Transmittance of s-wave at Incident Angle of 40 degrees | 68.9% | 67.3% | 65.9% |

As shown in Table 8, in the optical film 100 according to the embodiment, the energy transmittance Tp of p-wave light and the energy transmittance Ts of s-wave light are both high, compared with those in the comparative configurations 1 and 2.

CALCULATION EXAMPLE 9

In Calculation Example 9 differs from Calculation Example 1 in that the refractive index of the surface member in each of the embodiment and the comparative configurations 1 and 2 is 1.44. Table 9 shows the calculation results of energy transmittances in Calculation Example 9.

TABLE 9

|  | Optical Film of Embodiment | Optical Film of Comparative Configuration 1 | Optical Film of Comparative Configuration 2 |
| --- | --- | --- | --- |
| Refractive Index of Air Layer | 1.00 | 1.00 | 1.00 |
| Refractive Index of Surface Material | 1.44 | 1.44 | 1.44 |
| Refractive Index of Substrate | 1.49 | 1.35 | 1.87 |
| Refractive Index of High-Refractive-Index Layer | 1.65 | 1.65 | 1.65 |
| Refractive Index of Low-Refractive-Index Layer | 1.48 | 1.48 | 1.48 |
| Energy Transmittance of p-wave at Incident Angle of 0.01 degrees | 96.2% | 95.4% | 94.5% |
| Energy Transmittance of p-wave at Incident Angle of 20 degrees | 97.6% | 97.0% | 96.2% |

TABLE 9-continued

| | Optical Film of Embodiment | Optical Film of Comparative Configuration 1 | Optical Film of Comparative Configuration 2 |
|---|---|---|---|
| Energy Transmittance of p-wave at Incident Angle of 40 degrees | 93.3% | 93.3% | 92.9% |
| Energy Transmittance of s-wave at Incident Angle of 0.01 degrees | 96.2% | 95.4% | 94.5% |
| Energy Transmittance of s-wave at Incident Angle of 20 degrees | 94.5% | 93.5% | 92.4% |
| Energy Transmittance of s-wave at Incident Angle of 40 degrees | 68.0% | 66.3% | 65.4% |

As shown in Table 9, in the optical film 100 according to the embodiment, the energy transmittance Tp of p-wave light and the energy transmittance Ts of s-wave light are both high, compared with those in the comparative configurations 1 and 2.

CALCULATION EXAMPLE 10

Calculation Example 10 differs from Calculation Example 1 in that the refractive index of the substrate 101 in the embodiment is 1.47. Table 10 shows the calculation results of energy transmittances in Calculation Example 10.

TABLE 10

| | Optical Film of Embodiment |
|---|---|
| Refractive Index of Air Layer | 1.00 |
| Refractive Index of Surface Material | 1.40 |
| Refractive Index of Substrate | 1.47 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.56% |
| Energy Transmittance of p-wave at Incident Angle of 20 degrees | 97.82% |
| Energy Transmittance of p-wave at Incident Angle of 40 degrees | 93.17% |
| Energy Transmittance of s-wave at Incident Angle of 0.01 degrees | 96.56% |
| Energy Transmittance of s-wave at Incident Angle of 20 degrees | 95.00% |
| Energy Transmittance of s-wave at Incident Angle of 40 degrees | 69.75% |

CALCULATION EXAMPLE 11

Calculation Example 11 differs from Calculation Example 1 in that the refractive index of the substrate 101 in the embodiment is 1.51. Table 11 shows the calculation results of energy transmittances in Calculation Example 11.

TABLE 11

| | Optical Film of Embodiment |
|---|---|
| Refractive Index of Air Layer | 1.00 |
| Refractive Index of Surface Material | 1.40 |
| Refractive Index of Substrate | 1.51 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.61% |
| Energy Transmittance of p-wave at Incident Angle of 20 degrees | 97.87% |
| Energy Transmittance of p-wave at Incident Angle of 40 degrees | 93.19% |
| Energy Transmittance of s-wave at Incident Angle of 0.01 degrees | 96.61% |
| Energy Transmittance of s-wave at Incident Angle of 20 degrees | 95.06% |
| Energy Transmittance of s-wave at Incident Angle of 40 degrees | 69.83% |

CALCULATION EXAMPLE 12

Calculation Example 12 differs from Calculation Example 1 in that the refractive index of the substrate 101 in the embodiment is 1.53. Table 12 shows the calculation results of energy transmittances in Calculation Example 12.

TABLE 12

| | Optical Film of Embodiment |
|---|---|
| Refractive Index of Air Layer | 1.00 |
| Refractive Index of Surface Material | 1.40 |
| Refractive Index of Substrate | 1.53 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.61% |
| Energy Transmittance of p-wave at Incident Angle of 20 degrees | 97.87% |
| Energy Transmittance of p-wave at Incident Angle of 40 degrees | 93.19% |
| Energy Transmittance of s-wave at Incident Angle of 0.01 degrees | 96.61% |
| Energy Transmittance of s-wave at Incident Angle of 20 degrees | 95.06% |
| Energy Transmittance of s-wave at Incident Angle of 40 degrees | 69.82% |

CALCULATION EXAMPLE 13

Calculation Example 13 differs from Calculation Example 1 in that the refractive index of the substrate 101 in the embodiment is 1.55. Table 13 shows the calculation results of energy transmittances in Calculation Example 13.

TABLE 13

|  | Optical Film of Embodiment |
| --- | --- |
| Refractive Index of Air Layer | 1.00 |
| Refractive Index of Surface Material | 1.40 |
| Refractive Index of Substrate | 1.55 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.59% |
| Energy Transmittance of p-wave at Incident Angle of 20 degrees | 97.86% |
| Energy Transmittance of p-wave at Incident Angle of 40 degrees | 93.19% |
| Energy Transmittance of s-wave at Incident Angle of 0.01 degrees | 96.59% |
| Energy Transmittance of s-wave at Incident Angle of 20 degrees | 95.04% |
| Energy Transmittance of s-wave at Incident Angle of 40 degrees | 69.78% |

CALCULATION EXAMPLE 14

Calculation Example 14 differs from Calculation Example 1 in that the refractive index of the substrate 101 in the embodiment is 1.41. Table 14 shows the calculation results of energy transmittances in Calculation Example 14.

TABLE 14

|  | Optical Film of Embodiment |
| --- | --- |
| Refractive Index of Air Layer | 1.00 |
| Refractive Index of Surface Material | 1.40 |
| Refractive Index of Substrate | 1.41 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.34% |
| Energy Transmittance of p-wave at Incident Angle of 20 degrees | 97.66% |
| Energy Transmittance of p-wave at Incident Angle of 40 degrees | 93.16% |
| Energy Transmittance of s-wave at Incident Angle of 0.01 degrees | 93.16% |
| Energy Transmittance of s-wave at Incident Angle of 20 degrees | 94.73% |
| Energy Transmittance of s-wave at Incident Angle of 40 degrees | 69.31% |

CALCULATION EXAMPLE 15

Calculation Example 15 differs from Calculation Example 1 in that the refractive index of the substrate 101 in the embodiment is 1.59. Table 15 shows the calculation results of energy transmittances in Calculation Example 15.

TABLE 15

|  | Optical Film of Embodiment |
| --- | --- |
| Refractive Index of Air Layer | 1.00 |
| Refractive Index of Surface Material | 1.40 |
| Refractive Index of Substrate | 1.59 |
| Refractive Index of High-Refractive-Index Layer | 1.65 |
| Refractive Index of Low-Refractive-Index Layer | 1.48 |
| Energy Transmittance of p-wave at Incident Angle of 0.01 degrees | 96.51% |
| Energy Transmittance of p-wave at Incident Angle of 20 degrees | 97.80% |
| Energy Transmittance of p-wave at Incident Angle of 40 degrees | 93.18% |
| Energy Transmittance of s-wave at Incident Angle of 0.01 degrees | 93.18% |
| Energy Transmittance of s-wave at Incident Angle of 20 degrees | 94.94% |
| Energy Transmittance of s-wave at Incident Angle of 40 degrees | 69.62% |

CALCULATION EXAMPLE 16

Calculation Example 16 differs from Calculation Example 1 in that, in the embodiment, the refractive index of the surface member 102 is 1.37, the refractive index of the substrate 101 is 1.38, and the refractive index of the high-refractive index layer 105 is 1.58. Table 16 shows the calculation results of energy transmittances in Calculation Example 16.

TABLE 16

|  | Optical Film of Embodiment |
| --- | --- |
| Refractive Index of Air Layer | 1.00 |
| Refractive Index of Surface Material | 1.37 |
| Refractive Index of Substrate | 1.38 |
| Refractive Index of High-Refractive-Index Layer | 1.58 |
| Refractive Index of Low-Refractive-Index Layer | 1.48 |
| Energy Transmittance of p-wave at Incident Angle of 0.01 degrees | 97.01% |
| Energy Transmittance of p-wave at Incident Angle of 20 degrees | 98.15% |
| Energy Transmittance of p-wave at Incident Angle of 40 degrees | 93.17% |
| Energy Transmittance of s-wave at Incident Angle of 0.01 degrees | 97.01% |
| Energy Transmittance of s-wave at Incident Angle of 20 degrees | 95.61% |
| Energy Transmittance of s-wave at Incident Angle of 40 degrees | 71.40% |

CALCULATION EXAMPLE 17

Calculation Example 17 differs from Calculation Example 16 in that the refractive index of the substrate 101 in the embodiment is 1.43. Table 17 shows the calculation results of energy transmittances in Calculation Example 17.

TABLE 17

|  | Optical Film of Embodiment |
|---|---|
| Refractive Index of Air Layer | 1.00 |
| Refractive Index of Surface Material | 1.37 |
| Refractive Index of Substrate | 1.43 |
| Refractive Index of High-Refractive-Index Layer | 1.58 |
| Refractive Index of Low-Refractive-Index Layer | 1.48 |
| Energy Transmittance of p-wave at Incident Angle of 0.01 degrees | 97.17% |
| Energy Transmittance of p-wave at Incident Angle of 20 degrees | 98.27% |
| Energy Transmittance of p-wave at Incident Angle of 40 degrees | 93.18% |
| Energy Transmittance of s-wave at Incident Angle of 0.01 degrees | 97.17% |
| Energy Transmittance of s-wave at Incident Angle of 20 degrees | 95.81% |
| Energy Transmittance of s-wave at Incident Angle of 40 degrees | 71.75% |

CALCULATION EXAMPLE 18

Calculation Example 18 differs from Calculation Example 16 in that the refractive index of the substrate 101 in the embodiment is 1.49. Table 18 shows the calculation results of energy transmittances in Calculation Example 18.

TABLE 18

|  | Optical Film of Embodiment |
|---|---|
| Refractive Index of Air Layer | 1.00 |
| Refractive Index of Surface Material | 1.37 |
| Refractive Index of Substrate | 1.49 |
| Refractive Index of High-Refractive-Index Layer | 1.58 |
| Refractive Index of Low-Refractive-Index Layer | 1.48 |
| Energy Transmittance of p-wave at Incident Angle of 0.01 degrees | 97.20% |
| Energy Transmittance of p-wave at Incident Angle of 20 degrees | 98.30% |
| Energy Transmittance of p-wave at Incident Angle of 40 degrees | 93.19% |
| Energy Transmittance of s-wave at Incident Angle of 0.01 degrees | 97.20% |
| Energy Transmittance of s-wave at Incident Angle of 20 degrees | 95.85% |
| Energy Transmittance of s-wave at Incident Angle of 40 degrees | 71.79% |

CALCULATION EXAMPLE 19

Calculation Example 19 differs from Calculation Example 16 in that the refractive index of the substrate 101 in the embodiment is 1.51. Table 19 shows the calculation results of energy transmittances in Calculation Example 19.

TABLE 19

|  | Optical Film of Embodiment |
|---|---|
| Refractive Index of Air Layer | 1.00 |
| Refractive Index of Surface Material | 1.37 |
| Refractive Index of Substrate | 1.51 |
| Refractive Index of High-Refractive-Index Layer | 1.58 |
| Refractive Index of Low-Refractive-Index Layer | 1.48 |
| Energy Transmittance of p-wave at Incident Angle of 0.01 degrees | 97.18% |
| Energy Transmittance of p-wave at Incident Angle of 20 degrees | 98.28% |
| Energy Transmittance of p-wave at Incident Angle of 40 degrees | 93.19% |
| Energy Transmittance of s-wave at Incident Angle of 0.01 degrees | 97.18% |
| Energy Transmittance of s-wave at Incident Angle of 20 degrees | 95.81% |
| Energy Transmittance of s-wave at Incident Angle of 40 degrees | 71.73% |

CALCULATION EXAMPLE 20

In Calculation Example 20 differs from Calculation Example 16 in that the refractive index of the substrate 101 in the embodiment is 1.57. Table 20 shows the calculation results of energy transmittances in Calculation Example 20.

TABLE 20

|  | Optical Film of Embodiment |
|---|---|
| Refractive Index of Air Layer | 1.00 |
| Refractive Index of Surface Material | 1.37 |
| Refractive Index of Substrate | 1.57 |
| Refractive Index of High-Refractive-Index Layer | 1.58 |
| Refractive Index of Low-Refractive-Index Layer | 1.48 |
| Energy Transmittance of p-wave at Incident Angle of 0.01 degrees | 97.01% |
| Energy Transmittance of p-wave at Incident Angle of 20 degrees | 98.15% |
| Energy Transmittance of p-wave at Incident Angle of 40 degrees | 93.17% |
| Energy Transmittance of s-wave at Incident Angle of 0.01 degrees | 97.01% |
| Energy Transmittance of s-wave at Incident Angle of 20 degrees | 95.60% |
| Energy Transmittance of s-wave at Incident Angle of 40 degrees | 71.36% |

As it is clear from Calculation Examples 1 to 9, in the optical film 100 according to the embodiment, the energy transmittance Tp of p-wave light and the energy transmittance Ts of s-wave light are both high, compared with those in the comparative configurations 1 and 2. In particular, the energy transmittance Ts of light on the high-angle side (s-wave at the incident angle of 40 degrees) is considerably higher than those in the comparative configurations 1 and 2. That is, from this result, it can be said that the optical film 100 according to the embodiment can efficiently emit incident light, in particular, light having a large incident angle than the comparative configurations 1 and 2, and the display characteristics are improved.

Figure 5:
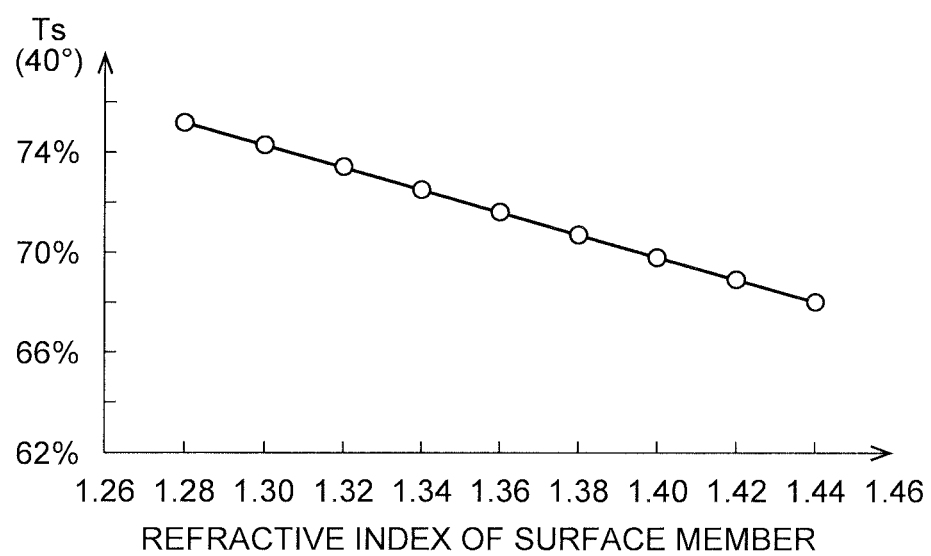
FIG. 5 is a graph illustrating the relationship between the refractive index of a surface member of the optical film provided in the display device illustrated in FIG. 1 and the energy transmittance of light that is transmitted through the optical film.

Here, FIG. 5 is a graph illustrating the relationship between the refractive index of the surface member 102 of the optical film 100 provided in the display device 10 and the energy transmittance of light that is transmitted through the optical film 100. To be specific, in FIG. 5, the relationship between the refractive index of the surface member 102 and the energy transmittance of s-wave light that is incident on the high-refractive index layer 105 from the low-refractive index layer 104 at an incident angle of 40 degrees is identified based on the results of Calculation Examples 1 to 9. The horizontal axis represents the refractive index of the surface member 102, and the vertical axis represents the energy transmittance of s-wave light.

It can be seen from FIG. 5 that the energy transmittance of s-wave light increases as the refractive index of the surface member 102 decreases. The energy transmittance of s-wave light in Calculation Examples 1 to 9 exceeds 70% when the refractive index of the surface member 102 is 1.40 or less. From this result, it is considered that the refractive index of the surface member 102 is preferably 1.40 or less.

Figure 6A:
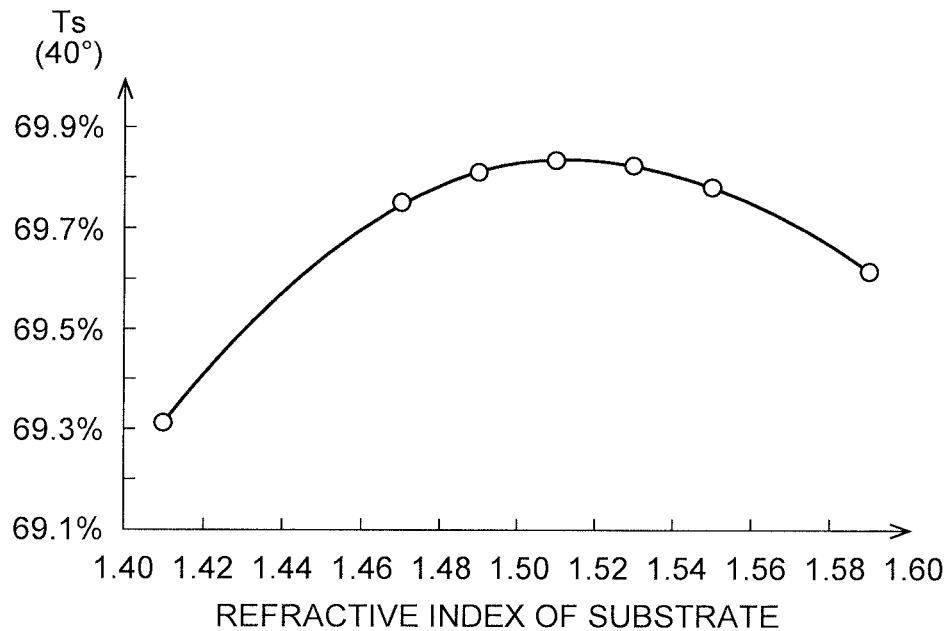
FIG. 6A is a graph illustrating the relationship between the refractive index of a substrate of the optical film provided in the display device illustrated in FIG. 1 and the energy transmittance of light that is transmitted through the optical film.

FIG. 6A is a graph illustrating the relationship between the refractive index of the substrate 101 of the optical film 100 provided in the display device 10 and the energy transmittance of light that is transmitted through the optical film 100. To be specific, in FIG. 6A, the relationship between the refractive index of the substrate 101 and the energy transmittance of s-wave light that is incident on the high-refractive index layer 105 from the low-refractive index layer 104 at the incident angle of 40 degrees is identified based on the results of Calculation Examples 1 and 10 to 15. The horizontal axis represents the refractive index of the substrate 101, and the vertical axis represents the energy transmittance of s-wave light.

It can be seen from FIG. 6A that the energy transmittance Ts of s-wave light at an incident angle of 40 degrees has a peak around a position where the refractive index of the substrate 101 is 1.51. Considering that the trend is quadratic-function like, it can be said that the energy transmittance Ts of light is noticeably high when the refractive index of the substrate 101 is in the range of 1.47 to 1.55, compared with the other cases.

Specifics are as follows.

Calculation Example 10: when the refractive index of the substrate 101 is 1.47, the difference between the refractive-index-difference (1.65–1.47) between the high-refractive index layer 105 and the substrate 101 and the refractive-index-difference (1.47–1.40) between the substrate 101 and the surface member 102 is 0.11. At this time, the energy transmittance Ts of s-wave light at the incident angle of 40 degrees is 69.75%.

Calculation Example 11: when the refractive index of the substrate 101 is 1.51, the difference between the refractive-index-difference (1.65–1.51) between the high-refractive index layer 105 and the substrate 101 and the refractive-index-difference (1.51–1.40) between the substrate 101 and the surface member 102 is 0.03. At this time, the energy transmittance Ts of s-wave light at the incident angle of 40 degrees is 69.83%.

Calculation Example 12: when the refractive index of the substrate 101 is 1.53, the difference between the refractive-index-difference (1.65–1.53) between the high-refractive index layer 105 and the substrate 101 and the refractive-index-difference (1.53–1.40) between the substrate 101 and the surface member 102 is 0.01. At this time, the energy transmittance Ts of s-wave light at the incident angle of 40 degrees is 69.82%.

Calculation Example 13: when the refractive index of the substrate 101 is 1.55, the difference between the refractive-index-difference (1.65–1.55) between the high-refractive index layer 105 and the substrate 101 and the refractive-index-difference (1.55–1.40) between the substrate 101 and the surface member 102 is 0.05. At this time, the energy transmittance Ts of s-wave light at the Incident angle of 40 degrees is 69.78%.

In consideration of the above facts, it can be said that energy efficiency increases as the difference between the refractive-index-difference between the high-refractive index layer 105 and the substrate 101 and the refractive-index-difference between the substrate 101 and the surface member 102 decreases. From these results, it can be said that, when the refractive index of the high-refractive index layer 105, the refractive index of the substrate 101, and the refractive index of the surface member 102 become smaller in this order, preferably, the refractive index of the high-refractive index layer 105, the refractive index of the substrate 101, and the refractive index of the surface member 102 are changed at the same rate or gradually changed.

However, in Calculation Example 11, the energy transmittance Ts of s-wave light at the incident angle of 40 degrees is slightly higher than that in Calculation Example 12. It is considered that this is due to the fact that the refractive index of the substrate 101 in Calculation Example 11 is smaller than the refractive index of the substrate 101 in Calculation Example 12. That is, from this result, it can be said that light transmission efficiency is more effectively improved by changing the refractive index of the high-refractive index layer 105, the refractive index of the substrate 101, and the refractive index of the surface member 102 at the same rate or gradually while making each of the refractive indices of the substrate 101 and the high-refractive index layer 105 small.

Figure 6B:
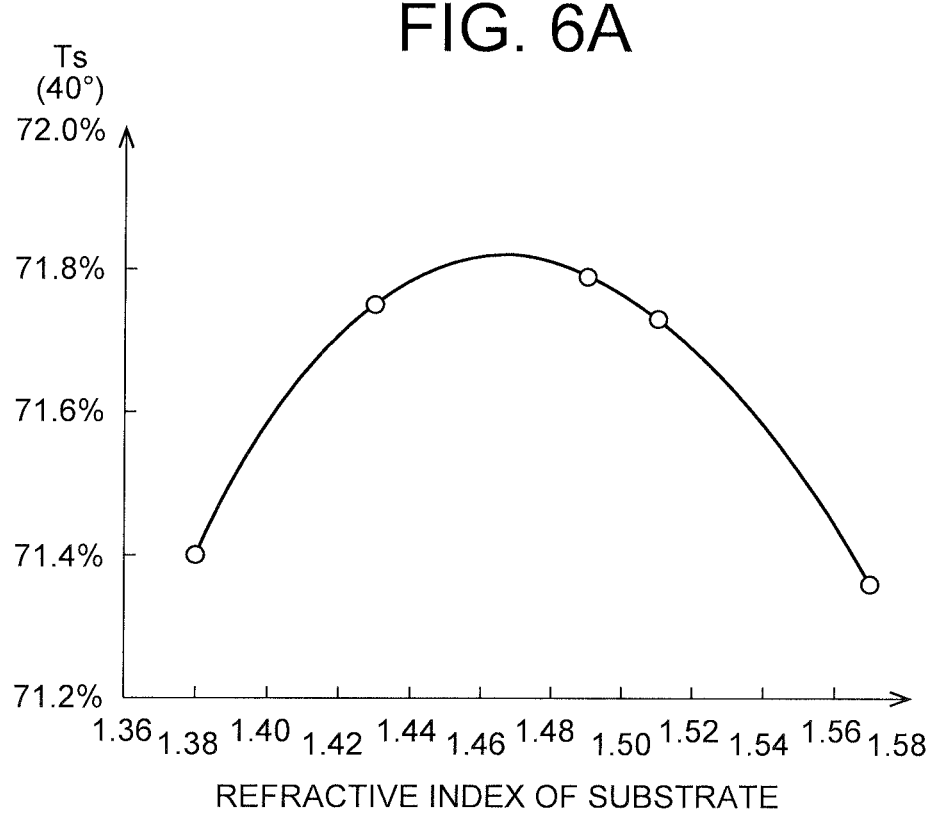
FIG. 6B is a graph illustrating the relationship between the refractive index of the substrate of the optical film provided in the display device illustrated in FIG. 1 and the energy transmittance of light that is transmitted through the optical film.

In FIG. 6B, the relationship between the refractive index of the substrate 101 and the energy transmittance of s-wave light that is incident on the high-refractive index layer 105 from the low-refractive index layer 104 at the incident angle of 40 degrees is specified based on the results of Calculation Examples 16 to 20. The horizontal axis represents the refractive index of the substrate 101, and the vertical axis represents the energy transmittance of s-wave light.

Also from the results shown in FIG. 6B, it can be said that, when the refractive index of the high-refractive index layer 105, the refractive index of the substrate 101, and the refractive index of the surface member 102 become smaller in this order, preferably, the refractive index of the high-refractive index layer 105, the refractive index of the substrate 101, and the refractive index of the surface member 102 are changed at the same rate or gradually changed. Moreover, in Calculation Examples 16 to 20, the refractive index of the surface member 102 and the refractive index of the high-refractive index layer 105 are small, compared to those in Calculation Examples 10 to 15 and the like. The energy transmittance Ts of s-wave light in Calculation Examples 16 to 20 is generally larger than those in Calculation Examples 10 to 15. Based on this result, it can be said that light transmission efficiency is more effectively improved by changing the refractive index of the high-refractive index layer 105, the refractive index of the substrate 101, and the refractive index of the surface member 102 at the same rate or gradually while making each of the refractive indices of the high-refractive index layer 105, the substrate 101, and the surface member 102 small.

In the optical film 100 according to the present embodiment described above, in the optical functional layer 103, the interface between the low-refractive index layer 104 and the high-refractive index layer 105 has the recessed/protruding shape 120. Thus, it is possible to emit light in a wide angular range by reflecting, refracting, and transmitting light for forming an image from the liquid crystal panel 15 at the interface between the low-refractive index layer 104 and the high-refractive index layer 105, and it is possible to improve the display quality of the image within the viewing angle. Moreover, the refractive index of the high-refractive index layer 105, the refractive index of the substrate 101, and the refractive index of the surface member 102 become smaller in this order. Thus, it is possible to emit light efficiently. Accordingly, it is possible to improve the display quality of an image within the viewing angle, while sufficiently suppressing an energy loss of light for forming the image.

Second Embodiment

Figure 7:
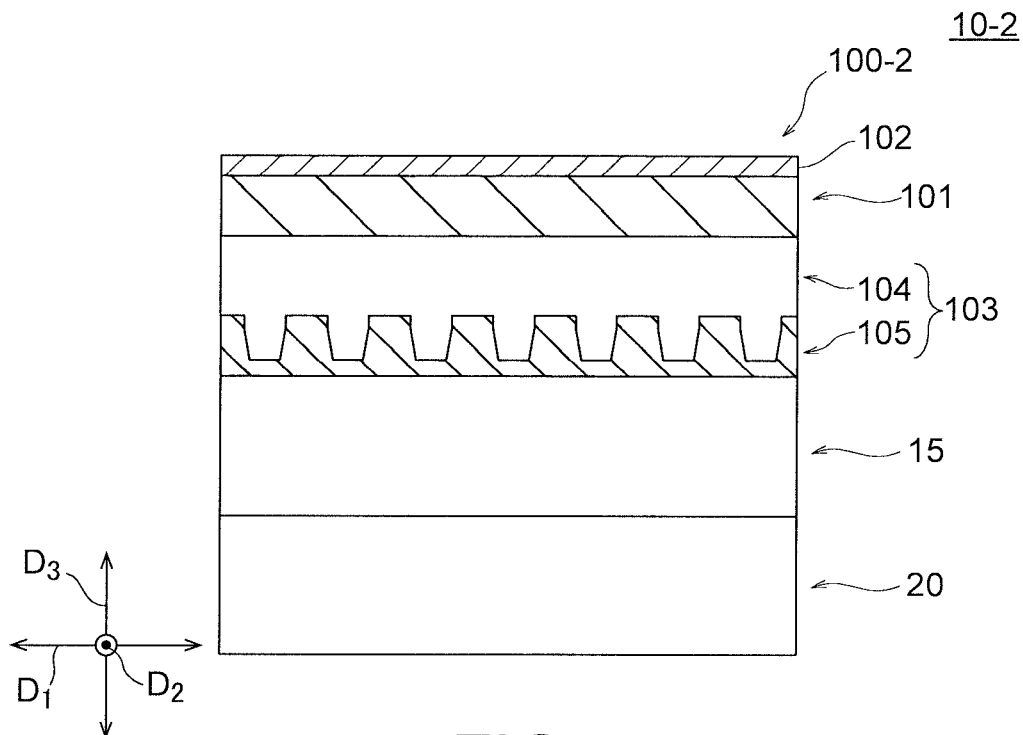
FIG. 7 is a schematic view illustrating the configuration of a display device including an optical film according to a second embodiment of the present invention.

FIG. 7 is a schematic view illustrating the configuration of a display device 10-2 including an optical film 100-2 according to a second embodiment. As illustrated in FIG. 7, in the present embodiment, the positions of the low-refractive index layer 104 and the high-refractive index layer 105 are opposite to those in the first embodiment. That is, the optical functional layer 103 is provided in the display device 10-2 so that the high-refractive index layer 105 and the display surface A of the liquid crystal panel 15 face each other. In the present embodiment, the refractive index of the high-refractive index layer 105, the refractive index of the low-refractive index layer 104, the refractive index of the substrate 101, and the refractive index of the surface member 102 become smaller in this order.

With such an embodiment, although the effect of improving the display quality within the viewing angle is different from that of the first embodiment, the embodiment is advantageous to the first embodiment in light emission efficiency.

Third Embodiment

Figure 8:
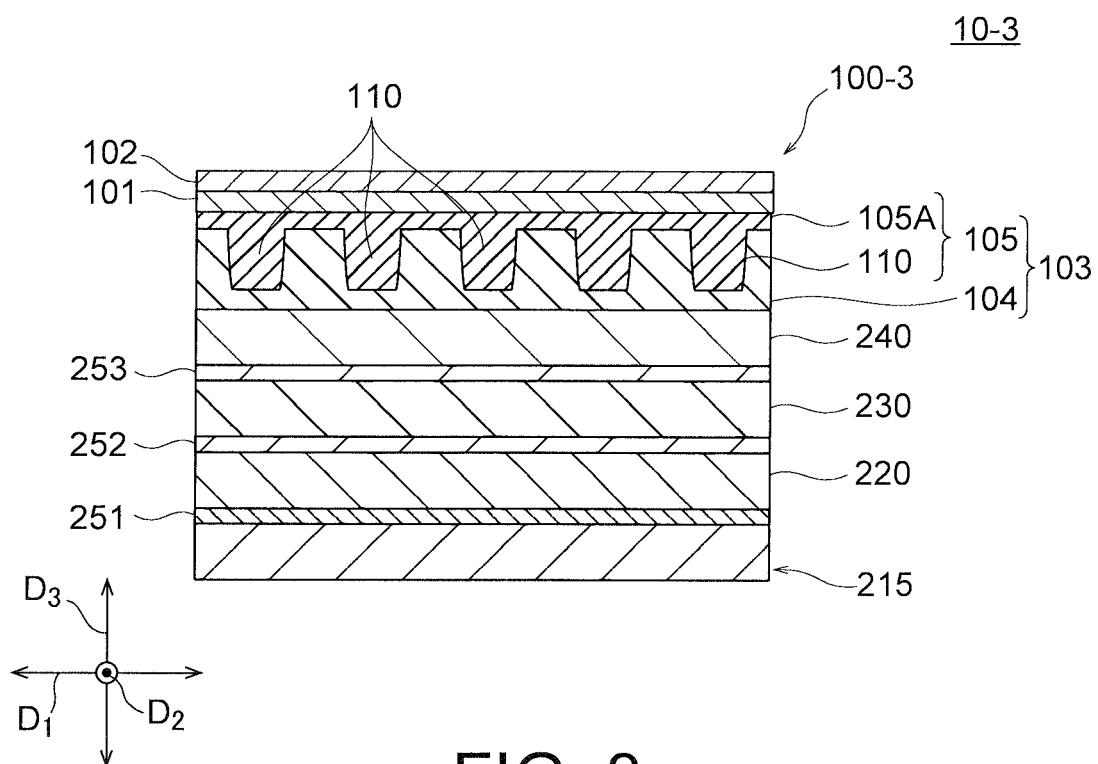
FIG. 8 is a schematic view illustrating the configuration of a display device including an optical film according to a third embodiment of the present invention.

FIG. 8 is a schematic view illustrating the configuration of a display device 10-3 including an optical film 100-3 according to a third embodiment. The display device 10-3 illustrated in FIG. 8 is configured by stacking an organic LED (organic light emitting diode) panel 215, a circularly polarizing plate 220, a touch panel 230, a cover glass 240, and the optical film 100-3 in this order. The display device 10-3 according to the present embodiment is configured as, for example, a smartphone. However, the display device 10-3 may be a tablet terminal, a television set, a computer display, a car navigation system, or the like.

The display surface (front surface) of the organic LED panel 215 and the back surface of the circularly polarizing plate 220 are affixed to each other via a first adhesive layer 251. The front surface of the circularly polarizing plate 220 and the back surface of the touch panel 230 are affixed to each other via a second adhesive layer 252. The front surface of the touch panel 230 and the back surface of the cover glass 240 are affixed to each other via a third adhesive layer 253. Each of the adhesive layers 251 to 253 is a so-called OCA (optical clear adhesive) layer, and has high light transmittance. The optical film 100-3 is disposed on the front surface of the cover glass 240. Although the optical film 100-3 and the cover glass 240 are not affixed to each other via an adhesive layer in the present embodiment, these may also be affixed to each other via an adhesive layer.

Also in such an embodiment, the refractive index of the high-refractive index layer 105, the refractive index of the substrate 101, and the refractive index of the surface member 102 become smaller in this order. Thus, light emission efficiency from the organic LED panel 215 can be improved.

Fourth Embodiment

Next, referring to FIGS. 9 to 12, an optical film 400 according to a fourth embodiment will be described. The optical film 400 according to the fourth embodiment can be applied to the display device 10 instead of the optical film in each of the first to third embodiments described above or by combining each feature of the optical film 400 according to the fourth embodiment described below with the optical film according to each of the first to third embodiments described above. In the following description, an example in which the optical film 400 according to the fourth embodiment is applied instead of the optical film according to the first embodiment will be described.

Figure 9:
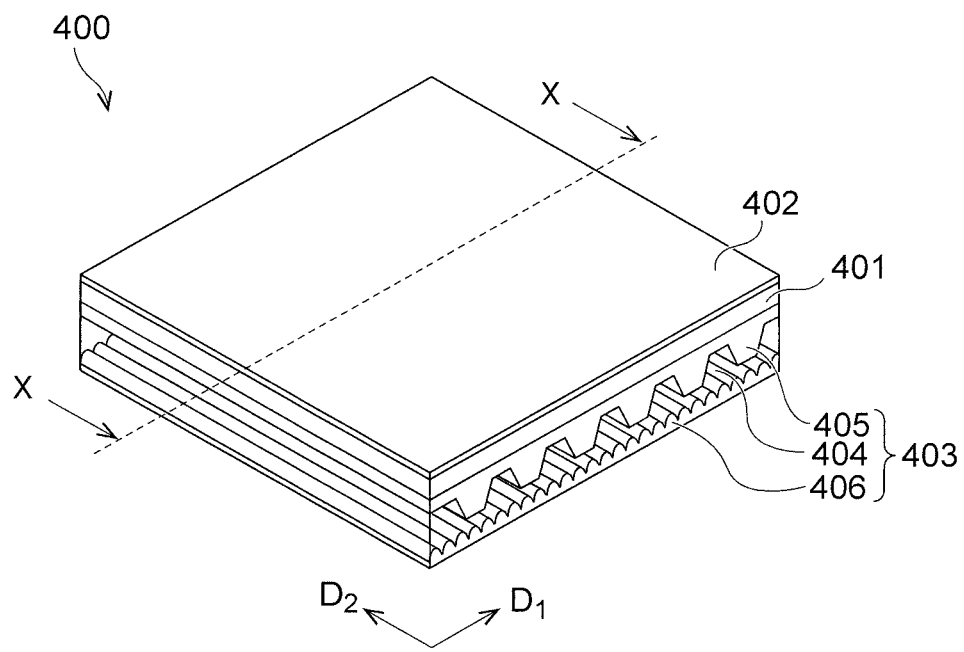
FIG. 9 is a perspective view illustrating the configuration of an optical film according to a fourth embodiment of the present invention.
Figure 10:
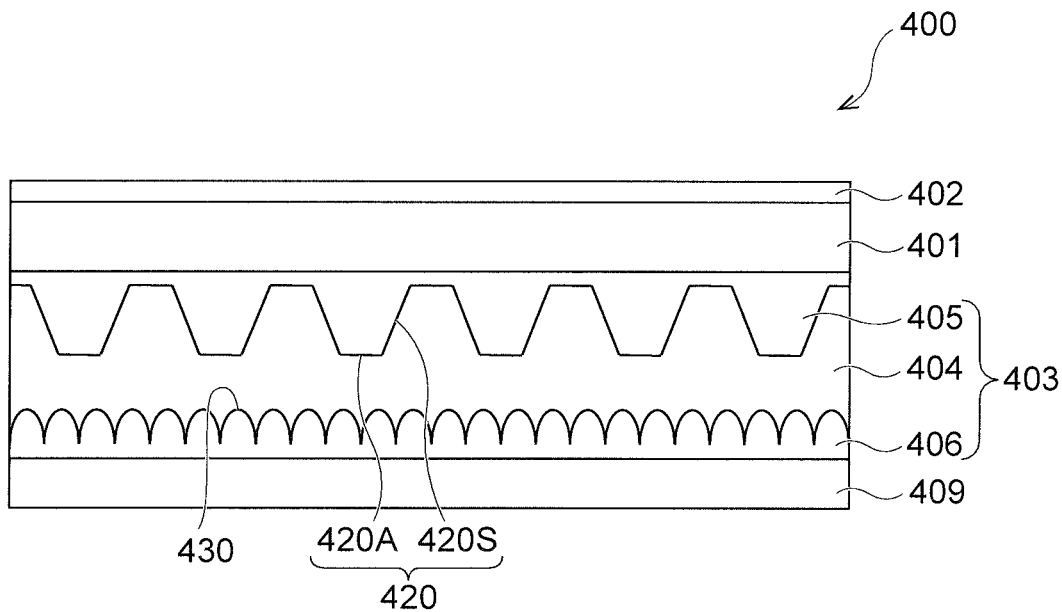
FIG. 10 is a sectional view of the optical film of FIG. 9 taken along line X-X.

FIG. 9 is a schematic perspective view illustrating the optical film 400 according to the fourth embodiment, and FIG. 10 is a sectional view of the optical film 400 taken along line X-X of FIG. 9. The optical film 400 is disposed to face the display surface 15A of the liquid crystal panel 15, and produces an optical effect on image light emitted from the display surface 15A to form an image. The optical film 400 is joined to the liquid crystal panel 15 via a joining layer (not shown). As illustrated in FIG. 9, the optical film 400 has a quadrangular shape in plan view, and, as a whole, has a rectangular-parallelepiped shape whose side in the thickness direction is smaller than the other sides.

In the example illustrated in FIGS. 9 and 10, the optical film 400 includes a substrate 401, an optical functional layer 403 provided on one side of the substrate 401, a second substrate 409 provided to a side of the optical functional layer 403 opposite to the side on which the substrate 401 is provided, and a surface member 402 provided to a side of the substrate 401 opposite to the side on which the optical functional layer 403 is provided. That is, the second substrate 409, the optical functional layer 403, the substrate 401, and the surface member 402 are stacked in this order from near the display surface 15A of the liquid crystal panel 15. The side on which the optical functional layer 403 of the optical film 400 is provided is a side that faces the display surface 15A of the liquid crystal panel 15. Accordingly, the surface member 402 of the optical film 400 forms a front surface of the display device 10.

The substrate 401 and the second substrate 409 are support substrates that appropriately support the optical functional layer 403. To be more specific, the substrate 401 supports a second layer 405 (described below) of the optical functional layer 403, and the second substrate 409 supports a third layer 406 (described below) of the optical functional layer 403. The substrate 401 and the second substrate 409 are transparent and made of, for example, triacetyl cellulose, polyethylene terephthalate, polyolefin, polycarbonate, polyacrylate, polyamide, glass, or the like. In consideration of transparency, the ability of appropriately supporting the optical functional layer 403, and the like, the substrate 401 and the second substrate 409 have a thickness that is preferably 5 µm or more and 120 µm or less, more preferably 20 µm or more and 90 µm or less, and further preferably 50 µm or more and 85 µm or less. The refractive indices of the substrate 401 and the second substrate 409 are preferably in the range of 1.38 or more and 1.57 or less, and more preferably 1.47 or more and 1.54 or less. The second substrate 409 may be omitted, for example, by being removed in the process of manufacturing the optical film 400. Alternatively, the second substrate 409 may be formed from the same material as the third layer 406 (described below) of the optical functional layer 403, and may be integrally formed with the third layer 406.

The term "transparent" refers to the degree of transparency with which it is possible to see the other side from one side of the substrate through the substrate, and for example, a total light transmittance of 87% or more, and preferably 90% or more. The total light transmittance can be measured by using a measuring device compliant with JIS K 7361-1: 1997 (for example, "HM150" made by Murakami Color Research Laboratory).

The surface member 402 forms the front surface of the display device 10, and is formed as a functional layer that performs a specific function. Examples of the function performed by the surface member 402 include an antireflection function. With the surface member 402 having an antireflection function, it is possible to suppress impairment of the viewability of an image displayed by the display device 10 due to surface reflection of light from the outside. The refractive index of the surface member 402 is 1.40 or less. However, the function of the surface member 402 is not limited to the antireflection function, and the surface member 402 may have a hard coating function, an antifouling function, an antistatic function, or the like.

The structure and the material of the surface member 402 are not particularly limited. Examples of the structure of the surface member 402 include: a low-refractive-index single layer structure; a dielectric multilayer structure of two layers, three layers, or the like; and a hollow-particle or porous structure. The surface member 402 may have, for example, a structure similar to that of the surface member 102 according to the first embodiment described above.

The optical functional layer 403 includes the second layer 405, a first layer 404 stacked on the second layer 405, and the third layer 406 stacked to a side of the first layer 404 opposite to the second layer 405. The second layer 405 includes portions that are arranged in the first direction $D_1$ and that extend in the second direction $D_2$ intersecting the first direction $D_1$. In the illustrated example, the first direction $D_1$ and the second direction $D_2$ are perpendicular to each other. The third layer 406 includes portions that are arranged in the first direction $D_1$ and that extend in the second direction $D_2$. The first layer 404 includes portions that extend in the second direction $D_2$ and that are arranged alternately with the second layer 405 in the first direction $D_1$, and portions that extend in the second direction $D_2$ and that are arranged alternately with the third layer 406 in the first direction $D_1$.

The second layer 405 is on a side of the substrate 401 in the optical film 400, and the third layer 406 is on a side in the optical film 400 facing the display surface 15A of the liquid crystal panel 15. The first layer 404 is positioned between the second layer 405 and the third layer 406. The refractive index of the second layer 405 and the refractive index of the first layer 404 are different from each other. The refractive index of the first layer 404 and the refractive index of the third layer 406 are different from each other. Accordingly, a first interface 420 between the second layer 405 and the first layer 404 and a second interface 430 between the first layer 404 and the third layer 406 are optical interfaces. The first interface 420 and the second interface 430 each have a recessed/protruding shape. Accordingly, the first interface 420 and the second interface 430 function as lenses. The first interface 420 includes a flat surface 420A that is parallel to the display surface 15A, and an inclined surface 420S that is not parallel to the display surface 15A.

Due to optical effects of the first interface 420 and the second interface 430 having recessed/protruding shapes, the optical film 400 can make it easier for image light to be emitted in a direction that is inclined toward the first direction $D_1$ with respect to the forward direction (normal direction) of the display device 10.

As illustrated in FIG. 10, the cross-sectional shape of the second layer 405 is a substantially trapezoidal shape having a longer base on the substrate 401 side and a shorter base on a side opposite the substrate 401. That is, the second layer 405 has a cross-sectional shape whose width in the first direction $D_1$ increases toward the substrate 401. Here, the sentence "width in the first direction $D_1$ increases toward the substrate 401" not only means that the width in the first direction $D_1$ continuously changes in accordance with the distance from the substrate 401, but also means that the second layer 405 does not include a portion whose width in the first direction $D_1$ decreases toward the substrate 401. Accordingly, the sentence also includes the meaning that the width in the first direction $D_1$ changes in a stepwise manner in accordance with the distance from the substrate 401. However, preferably, the cross-sectional shape of the second layer 405 continuously changes in accordance with the distance from the substrate 401.

In the cross-sectional shape of the second layer 405, a leg portion of the trapezoid shape need not be linear, and may be curved. That is, a side surface of the second layer 405 may be a curved surface. As the cross-sectional shape of the second layer 405 changes, the shape of the inclined surface 420S of the optical first interface 420 between the second layer 405 and the first layer 404 changes, and desirable optical characteristics can be exhibited due to the shape of the first interface 420.

The second layer 405 is transparent. The second layer 405 can be formed, for example, by disposing a UV-curable resin such as urethane acrylate on the substrate 401 and by curing the resin by irradiating the resin with ultraviolet rays.

As illustrated in FIGS. 9 and 10, the first layer 404 is provided so that spaces between adjacent portions of the second layer 405 that extend in the second direction $D_2$ and spaces between adjacent portions of the third layers 406 that extend in the second direction $D_2$ are filled with the first layer 404. In other words, the first layer 404 is provided so that the gap between the second layer 405 and the third layer 406 is filled with the first layer 404. The first layer 404 is, for example, a joining layer that joins the second layer 405 and the third layer 406 to each other. The first layer 404 is transparent. The first layer 404 may be formed of, for example, an acrylic UV-curable resin.

As illustrated in FIG. 10, the third layer 406 has a cross-sectional shape whose width in the first direction $D_1$ decreases toward the first layer 404. In the illustrated example, the sectional shape of the third layer 406 is a semi-ellipsoidal shape. Here, the sentence "width in the first direction $D_1$ decreases toward the first layer 404" not only means that the width in the first direction $D_1$ continuously changes in accordance with the distance from the first layer 404, but also means that the third layer 406 does not include a portion whose width in the first direction $D_1$, increases toward the first layer 404. Accordingly, the sentence also includes the meaning that the width in the first direction $D_1$ changes in a stepwise manner in accordance with the distance from the first layer 404. However, preferably, the cross-sectional shape of the third layer 406 continuously changes in accordance with the distance from the first layer 404.

The sectional shape of the third layer 406 may include, not only a curved portion illustrated in the figure, but also a linear portion. Due to the sectional shape of the third layer 406, the shape of the optical second interface 430 between the first layer 404 and the third layer 406 changes, and desirable optical characteristics can be exhibited due to the shape of the second interface 430.

The third layer 406 is transparent. The third layer 406 can be formed, for example, by disposing a UV-curable resin such as urethane acrylate on the second substrate 409 and by curing the resin by irradiating the resin with ultraviolet rays.

In the present embodiment, the refractive index of the first layer 404 is smaller than the refractive index of the second layer 405 and the refractive index of the third layer 406. Therefore, it is possible to increase the difference between the refractive index of the second layer 405 and the refractive index of the first layer 404 and the difference between the refractive index of the first layer 404 and the refractive index of the third layer 406. As the refractive index difference increases, it becomes easier for an optical effect at the interface to be produced. To be specific, the difference between the refractive index of the second layer 405 and the refractive index of the first layer 404 and the difference between the refractive index of the first layer 404 and the refractive index of the third layer 406 are preferably 0.05 or more and 0.25 or less. In the present embodiment, the refractive index of the second layer 405 is, for example, 1.6 or more, the refractive index of the first layer 404 is, for example, 1.49 or less, and the refractive index of the third layer 406 is, for example, 1.6 or more. It is possible to check the comparison between refractive indices at an interface by using, for example, the refraction direction or the total reflection condition of light that is incident on the interface. It is possible to measure the specific value of a refractive index by using, for example, an Abbe refractometer (for example, RX-7000α made by Atago Co., Ltd.).

The pitch of the recesses and protrusions of the recessed/protruding shape of the first interface 420 is smaller than the pitch of the pixels of the liquid crystal panel 15. In particular, the ratio of the pitch of the recesses and protrusions of the recessed/protruding shape of the first interface 420 to the pitch of the pixels of the liquid crystal panel 15 is preferably ⅕ or less, and more preferably ¹⁄₁₀ or less. Moreover, the pitch of the recesses and protrusions of the recessed/protruding shape of the first interface 420 is larger than the pitch of the recesses and protrusions of the recessed/protruding shape of the second interface 430. To be specific, preferably, the pitch of the recesses and protrusions of the recessed/protruding shape of the first interface 420 is three times or more of the pitch of the recesses and protrusions of the recessed/protruding shape of the second interface 430. Specifically, the pitch of the recesses and protrusions of the recessed/protruding shape of the first interface 420 is, for example, 35 μm or less. Specifically, the pitch of the recesses and protrusions of the recessed/protruding shape of the second interface 430 is, for example, 12 μm or less.

Next, effects of the optical film 400 according to the present embodiment and the display device 10 including the optical film 400 will be described.

Figure 11:
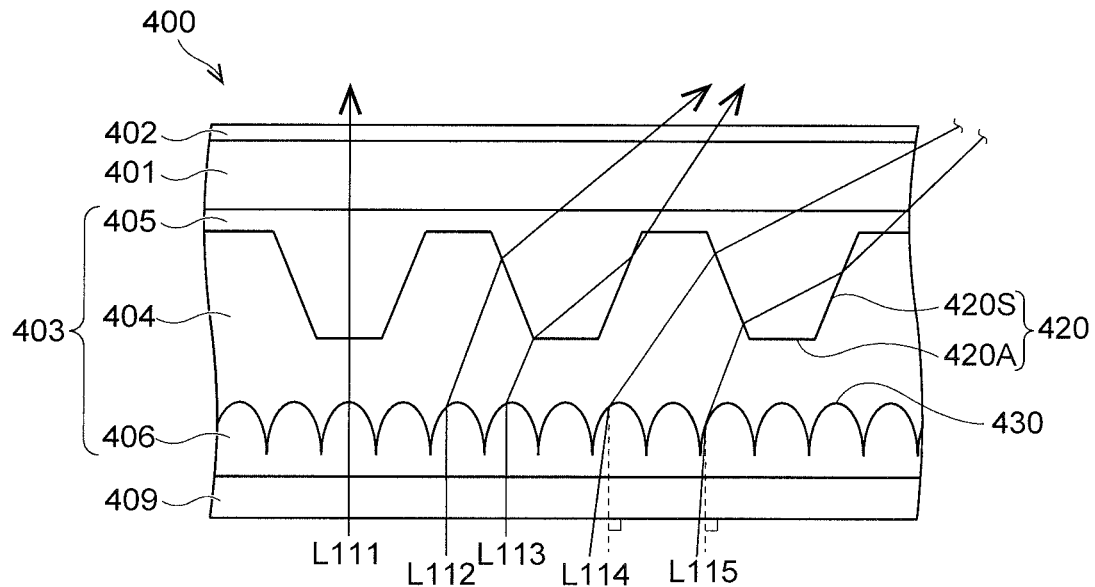
FIG. 11 illustrates effects on image light that is incident from the display device on the optical film according to the fourth embodiment.

Image light emitted from the display surface 15A of the liquid crystal panel 15 becomes incident on the optical functional layer 403 of the optical film 400. As illustrated in FIG. 11, the image light incident on the optical functional layer 403 first travels through the third layer 406, and next becomes incident on the second interface 430 between the third layer 406 and the first layer 404. In the image light incident on the second interface 430, image light L111, which travels in a direction the same as the normal direction of incident position, passes through the second interface 430 without being refracted at the second interface 430. On the other hand, in the image light incident on the second interface 430, image light L112 and image light L113, each of which is image light that travels in a direction different from the normal direction of incident position and that travels in the forward direction, and image light L114 and image light L115, each of which travels in a direction inclined with respect to the forward direction, are refracted due to the refractive index difference between the first layer 404 and the third layer 406 to increase the inclination angle thereof with respect to the forward direction. Each of the image light L112 to L115 that has passed through the second interface 430 is transmitted through the first layer 404, and becomes incident on the first interface 420 between the first layer 404 and the second layer 405.

The image light L111 that is incident on the flat surface 420A of the first interface 420 between the second layer 405 and the first layer 404 in a direction the same as the normal direction of the flat surface 420A passes through the first interface 420 without being refracted at the first interface 420, and is emitted from the optical functional layer 403. On the other hand, each of image light L112 to L115 that is incident on the inclined surface 420S of the first interface 420 between the second layer 405 and the first layer 404 is refracted due to the refractive index difference between the second layer 405 and the first layer 404 to further increase the inclination angle thereof with respect to the forward direction. Subsequently, some image light L112 and L114 is emitted from the optical functional layer 403, and the other image light L113 and L115 is further refracted at the first interface 420 between the second layer 405 and the first layer 404 and then is emitted from the optical functional layer 403. Each of the image light L112 to L115 travels in a direction that is further inclined with respect to the first direction due to refraction at the second interface 430 between the first layer 404 and the third layer 406 and refraction at the first interface 420 between the second layer 405 and the first layer 404 when being transmitted through the optical functional layer 403.

Optical effects that image light receives at the first interface 420 and the second interface 430 include not only the refractive effect described above but also a diffractive effect due to the recessed/protruding shape of the first interface 420 and the recessed/protruding shape of the second interface 430. That is, image light incident on the optical functional layer 403 is refracted due to the recessed/protruding shape of the first interface 420 and the recessed/protruding shape of the second interface 430, and travels in a direction that is further inclined with respect to the forward direction.

For example, an optical film described in Japanese Patent No. 6447654 has only one optical interface between a low-refractive index layer and a high-refractive index layer. Therefore, image light that passes through the optical film receives an optical effect at the interface only once. That is, the image light is refracted and diffracted only once. By being refracted and diffracted only once, the image light is not likely to be expanded to a large viewing angle. In other words, it may not be possible to sufficiently increase the viewing angle.

On the other hand, in the present embodiment, as described above, image light emitted from the display surface 15A passes through the first interface 420 between the second layer 405 and the first layer 404 and the second interface 430 between the first layer 404 and the third layer 406. Therefore, the image light is transmitted through the two optical interfaces 420 and 430. That is, due to refraction and diffraction at the second interface 430 between the first layer 404 and the third layer 406 and refraction and diffraction at the first interface 420 between the second layer 405 and the first layer 404, when image light is transmitted through the optical functional layer 403, the angle between the traveling direction of the image light and the forward direction tends to become large as illustrated in FIG. 11. In this way, image light receives an optical effect at an interface, that is, refraction and diffraction at the interface twice. Due to both of the refractions and diffractions that occur twice, the inclination angle of the image light with respect to the forward direction increases. Accordingly, it becomes easier for image light to be emitted in a direction that is inclined from the forward direction toward the first direction $D_1$. Therefore, it becomes possible to clearly observe image light from a direction that is inclined toward the first direction $D_1$. That is, it is possible to increase the viewing angle of an image from the display device 10. In this way, by refracting and diffracting image light twice so that the inclination angle with respect to the forward direction increases, it is possible to expand the image light to a viewing angle larger than that of a case where refraction and diffraction occur only once.

The refractive index of the first layer 404 is smaller than the refractive index of the second layer 405 and the refractive index of the third layer 406. Therefore, it is possible to increase the difference between the refractive index of the second layer 405 and the refractive index of the first layer 404 and the difference between the refractive index of the first layer 404 and the refractive index of the third layer 406. As the refractive index difference increases, it become easier for an optical effect at the interface to be produced. That is, it becomes easier for light to be refracted and diffracted at a large refraction angle at the first interface 420 and the second interface 430. As image light passes through the first interface 420 and the second interface 430 configured as described above, it is possible to expand the image light to a large viewing angle.

Moreover, the pitch of the recesses and protrusions of the recessed/protruding shape of the first interface 420 is larger than the pitch of the recesses and protrusions of the recessed/protruding shape of the second interface 430. That is, the pitch of the recesses and protrusions of the recessed/protruding shape of the first interface 420 is different from the pitch of the recesses and protrusions of the recessed/protruding shape of the second interface 430. Therefore, an interference pattern is not easily generated due to interference between the recessed/protruding shape of the first interface 420 and the recessed/protruding shape of the second interface 430. In particular, the interference pattern is scarcely visible when the pitch of the recesses and protrusions of the recessed/protruding shape of the first interface 420 is three times or more of the pitch of the recesses and protrusions of the recessed/protruding shape of the second interface 430. Because generation of the interference pattern is suppressed, it is possible to suppress impairment of the viewability of an image displayed by the display device 10.

It is possible to make various modifications to the fourth embodiment.

For example, in the embodiment described above, in order to increase the difference between the refractive index of the second layer 405 and the refractive index of the first layer 404 and the difference between the refractive index of the first layer 404 and the refractive index of the third layer 406, the refractive index of the first layer 404 is smaller than the refractive index of the second layer 405 and the refractive index of the third layer 406. However, the refractive index of the first layer 404 may be larger than the refractive index of the second layer 405 and the refractive index of the third layer 406. In this case, the refractive index of the second layer 405 is, for example, 1.49 or less, the refractive index of the first layer 404 is, for example, 1.6 or more, and the refractive index of the third layer 406 is for example, 1.49 or less.

Also in this modification, image light travels in a direction that is further inclined with respect to the forward direction due to refraction at the second interface 430 between the first layer 404 and the third layer 406 and refraction at the first interface 420 between the second layer 405 and the first layer 404. That is, it is possible to expand the image light to a large viewing angle.

The second substrate 409 of the optical film 400 may be a polarizing plate. In this case, the upper polarizing plate 13 of the liquid crystal panel 15 can be omitted. That is, the second substrate 409 functions as the upper polarizing plate 13 of the liquid crystal panel 15. Accordingly, the second substrate 409, which is a polarizing plate, absorbs a linear polarized component that oscillates in a direction different from a linear polarized component that the lower polarizing plate 14 absorbs. With such a configuration, a joining layer that joins the optical film 400 and the liquid crystal panel 15 may be omitted. Therefore, it is possible to easily manufacture the display device 10 including the optical film 400.

Hereafter, the optical film 400 according to the fourth embodiment will be described in further detail by using Examples, but the optical film 400 according to the fourth embodiment is not limited to the following Examples.

Regarding Examples 1 and 2 and Comparative Examples 1 and 2 described below, in a state in which an image in white color was displayed on a display surface of a liquid crystal panel, luminance was measured at each angle inclined with respect to the forward direction of the liquid crystal panel. The angular distribution of normalized luminance was calculated by dividing the luminance at each angle by luminance at an angle of 0°, that is, luminance in the forward direction.

In Examples 1 and 2 and Comparative Examples 1 and 2, the optical film is provided to face the display surface of a liquid crystal panel. In Example 1 and Example 2, the optical film includes a second layer, a first layer stacked on the second layer, and a third layer stacked to a side of the first layer opposite to the second layer. A first interface between the second layer and the first layer has a recessed/protruding shape. A second interface between the first layer and the third layer also has a recessed/protruding shape. In a cross section perpendicular to the direction in which the second layer extends, the pitch of the recessed/protruding shape of the first interface is 35 µm. The length of the flat surface of the first interface near the liquid crystal panel is 10.2 µm. The length of the flat surface of the first interface far from the liquid crystal panel is 17.6 µm. The length of the inclined surface of the first interface is 16.8 µm. The inclined surface of the first interface is a curved surface whose radius of curvature is 61 µm. In a cross section perpendicular to the direction in which the third layer extends, the second interface has a semi-elliptical shape. The pitch of the recessed/protruding shape of the second interface is 8.75 µm. The minor-axis diameter of the semi-elliptical shape of the second interface is 8.75 µm, and the major-axis diameter is 17.5 µm. In Example 1, the refractive index of the first layer is smaller than the refractive index of the second layer and the refractive index of the third layer. To be specific, the refractive index of the second layer is 1.65, the refractive index of the first layer is 1.48, and the refractive index of the third layer is 1.65. In Example 2, the refractive index of the first layer is larger than the refractive index of the second layer and the refractive index of the third layer. To be specific, the refractive index of the second layer is 1.48, the refractive index of the first layer is 1.65, and the refractive index of the third layer is 1.48. In Comparative Example 2, the optical film includes the second layer and the first layer stacked on the second layer, but does not include a third layer in contrast to Example 1 and Example 2. The first interface between the second layer and the first layer has a recessed/protruding shape. The pitch of the recessed/protruding shape of the first interface is 35 µm, the length of a flat surface of the first interface near the display device is 10.2 µm, and the length of a flat surface of the first interface far from the display device is 17.6 µm. The refractive index of the second layer is larger than the refractive index of the first layer. To be specific, the refractive index of the second layer is 1.65, and the refractive index of the first layer is 1.48. In Comparative Example 1, an optical film facing the liquid crystal panel is not provided.

Figure 12:
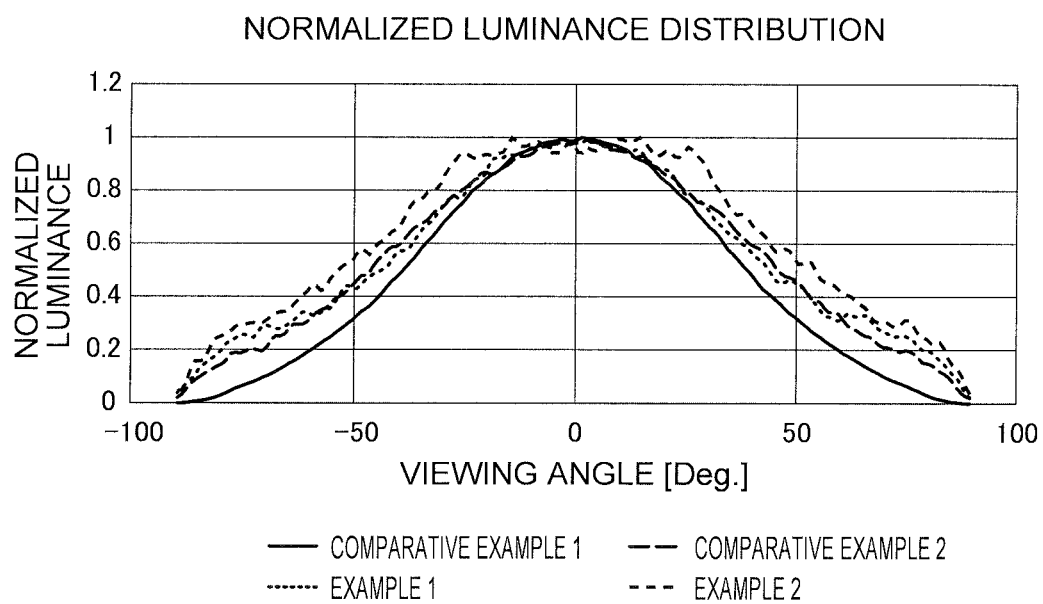
FIG. 12 is a graph illustrating distributions of the normalized luminance with respect to the viewing angle of Examples and Comparative Examples of the optical film according to the fourth embodiment.

FIG. 12 illustrates a graph of the angular distribution of normalized luminance at each angle (viewing angle) with respect to the forward direction in each of Examples and Comparative Examples. As can be seen from FIG. 12, the normalized luminance is high at large viewing angles in Example 1 and Example 2, compared with Comparative Example 1 and Comparative Example 2. The reason for this is considered that it became easier for image light to be emitted at large viewing angles, because the angle between the traveling direction of light and the forward direction was increased due to refraction and diffraction at the second interface between first layer and the third layer and refraction and diffraction at the first interface between the second layer and the first layer.

Fifth Embodiment

Figure 16:
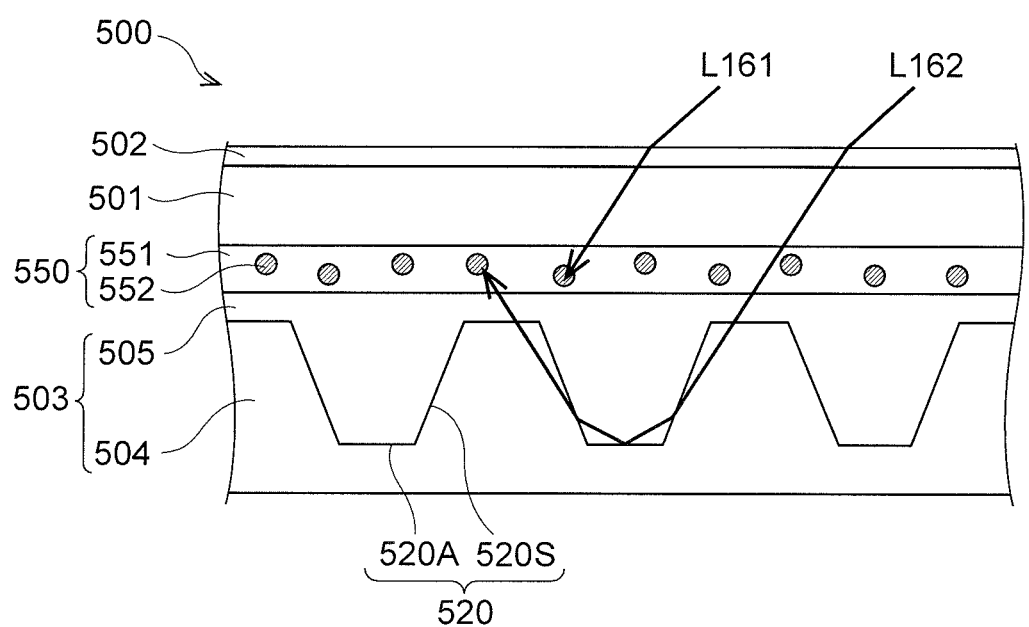
FIG. 16 illustrates effects on light that is incident from the outside on the optical film according to the fifth embodiment.

Next, referring to FIGS. 13 and 16, an optical film 500 according to a fifth embodiment will be described. The optical film 500 according to the fifth embodiment can be applied to the display device 10 instead of the optical film in each of the first to third embodiments described above or by combining each feature of the optical film 500 according the fifth embodiment with the optical film according to the first to third embodiments described above. In the following description, an example in which the optical film 500 according the fifth embodiment is applied instead of the optical film according to the first embodiment will be described.

Figure 13:
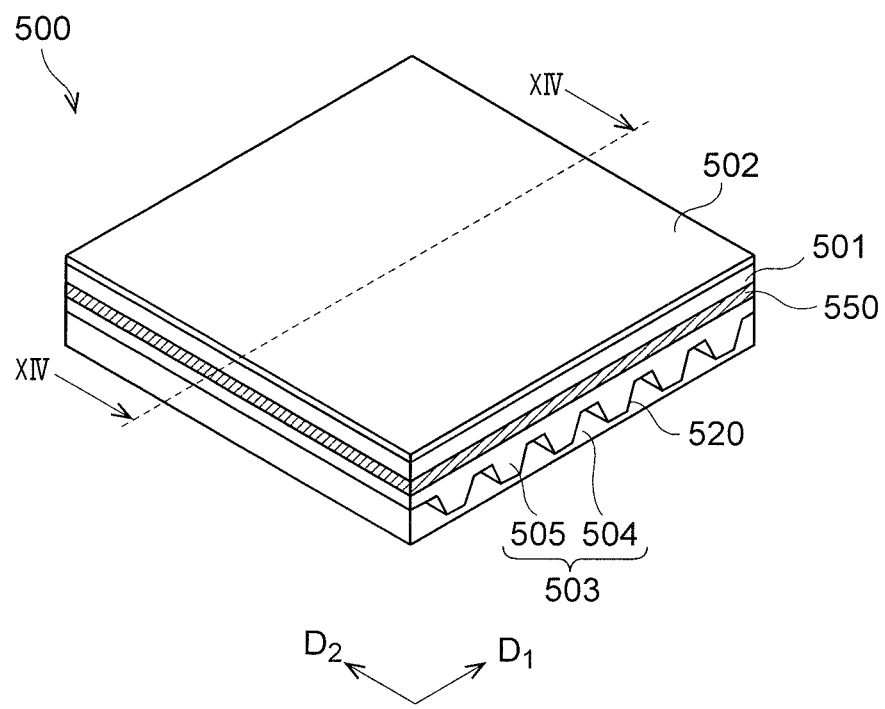
FIG. 13 is a perspective view illustrating the configuration of an optical film according to a fifth embodiment of the present invention.
Figure 14:
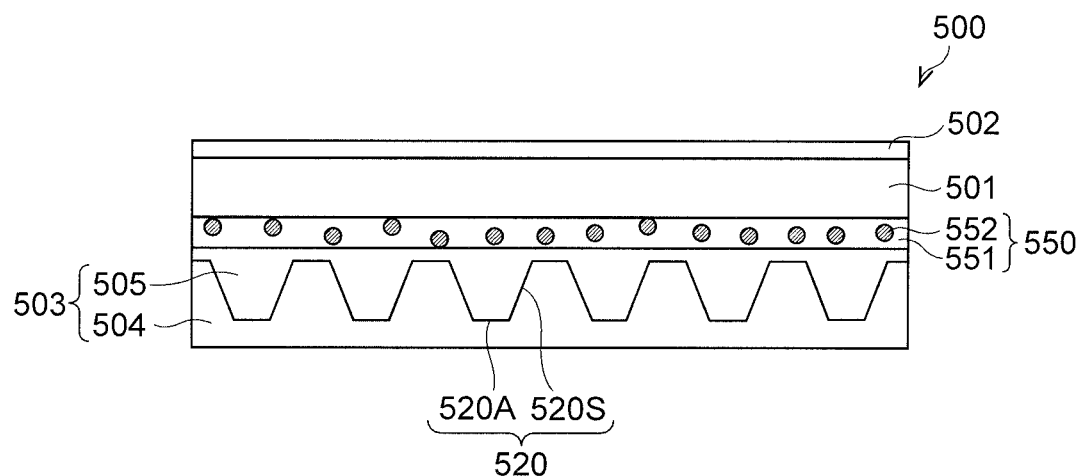
FIG. 14 is a sectional view of the optical film of FIG. 13 taken along line XIV-XIV.

FIG. 13 is a schematic perspective view illustrating the optical film 500 according to the fifth embodiment, and FIG. 14 is a sectional view of the optical film 500 taken along line XIV-XIV film of FIG. 13. The optical film 500 is disposed to face the display surface 15A of the liquid crystal panel 15, and produces an optical effect on image light emitted from the display surface 15A to form an image. As illustrated in FIG. 13, the optical film 500 has a quadrangular shape in plan view, and, as a whole, has a rectangular-parallelepiped shape whose side in the thickness direction is smaller than the other sides.

In the example illustrated in FIGS. 13 and 14, the optical film 500 includes a substrate 501, an optical functional layer 503 provided on one side of the substrate 501, a colored layer 550 disposed between the substrate 501 and the optical functional layer 503, and a surface member 502 provided on a side of the substrate 501 opposite to the side on which the optical functional layer 503 is provided. The side on which the optical functional layer 503 of the optical film 500 is provided is a side that faces the display surface 15A of the liquid crystal panel 15. Accordingly, the surface member 502 of the optical film 500 forms a front surface of the display device 10.

The substrate 501 is a support substrate that appropriately supports the optical functional layer 503. The substrate 501 is transparent and made of, for example, triacetyl cellulose, polyethylene terephthalate, polyolefin, polycarbonate, polyacrylate, polyamide, glass, or the like. In consideration of transparency, the ability of appropriately supporting the optical functional layer 503, and the like, the substrate 501 has a thickness that is preferably 5 µm or more and 120 µm or less, more preferably 20 µm or more and 90 µm or less, and further preferably 50 µm or more and 85 µm or less. The refractive index of the substrate 501 is preferably in the range of 1.38 or more and 1.57 or less, and more preferably 1.47 or more and 1.54 or less.

The surface member 502 forms the front surface of the display device 10, and is formed as a functional layer that performs a specific function. Examples of the function performed by the surface member 502 include an antireflection function. With the surface member 502 having an antireflection function, it is possible to suppress impairment of the viewability of an image displayed by the display device 10 due to surface reflection of light from the outside. The refractive index of the surface member 502 is 1.40 or less. However, the function of the surface member 502 is not limited to the antireflection function, and the surface member 502 may have a hard coating function, an antifouling function, an antistatic function, or the like.

The structure and the material of the surface member 502 are not particularly limited. Examples of the structure of the surface member 502 include: a low-refractive-index single layer structure; a dielectric multilayer structure of two layers, three layers, or the like; and a hollow-particle or porous structure. The surface member 502 may have, for example, a structure similar to that of the surface member 102 according to the first embodiment described above.

The optical functional layer 503 includes a second layer 505 and a first layer 504 stacked on the second layer 505. The second layer 505 includes portions that are arranged in the first direction $D_1$ and that extend in the second direction $D_2$ intersecting the first direction $D_1$. In the illustrated example, the first direction $D_1$ and the second direction $D_2$ are perpendicular to each other. The first layer 504 includes portions that extend in the second direction $D_2$ and that are arranged alternately with the second layer 505 in the first direction $D_1$. The second layer 505 is on a side of the substrate 501 in the optical film 500, and the first layer 504 is on a side in the optical film 500 facing the display surface 15A of the liquid crystal panel 15. The refractive index of the second layer 505 and the refractive index of the first layer 504 are different from each other. Accordingly, an interface 520 between the second layer 505 and the first layer 504 is an optical interface. The interface 520 between the second layer 505 and the first layer 504 has a recessed/protruding shape, and forms a lens. The interface 520 between the second layer 505 and the first layer 504 includes a flat surface 520A that is parallel to the display surface 15A, and an inclined surface 520S that is not parallel to the display surface 15A. Due to an optical effect of the interface 520 having recessed/protruding shapes, in particular, due to an optical effect of the inclined surface 520S of the interface 520, the optical film 500 can make it easier for image light to be emitted in a direction that is inclined toward the first direction $D_1$ with respect to the forward direction (normal direction) of the display device 10.

As illustrated in FIG. 14, the cross-sectional shape of the second layer 505 is a substantially trapezoidal shape having a longer base on the substrate 501 side and a shorter base on a side opposite the substrate 501. That is, the second layer 505 has a cross-sectional shape whose width in the first direction $D_1$ increases toward the substrate 501. Here, the sentence "width in the first direction $D_1$ increases toward the substrate 501" not only means that the width in the first direction $D_1$ continuously changes in accordance with the distance from the substrate 501, but also means that the second layer 505 does not include a portion whose width in the first direction $D_1$ decreases toward the substrate 501. Accordingly, the sentence also includes the meaning that the width in the first direction $D_1$ changes in a stepwise manner in accordance with the distance from the substrate 501. However, preferably, the cross-sectional shape of the second layer 505 continuously changes in accordance with the distance from the substrate 501.

In the cross-sectional shape of the second layer 505, a leg portion of the trapezoid shape need not be linear, and may be curved. That is, a side surface of the second layer 505 may be a curved surface. As the cross-sectional shape of the second layer 505 changes, the shape of the inclined surface 520S of the optical interface 520 between the second layer 505 and the first layer 504 changes, and desirable optical characteristics can be exhibited due to the shape of the interface 520.

The pitch of the arrangement of a plurality of second layers 505 in the first direction $D_1$ is smaller than the pitch of the pixels of the liquid crystal panel 15. In particular, the ratio of the pitch of the arrangement of the second layers 505 in the first direction $D_1$ to the pitch of the pixels of the liquid crystal panel 15 is preferably ⅕ or less, and more preferably 1/10 or less. To be specific, the pitch of the arrangement of the second layers 505 in the first direction $D_1$ is, for example, 35 μm or less.

The second layer 505 is transparent. The second layer 505 can be formed, for example, by disposing a UV-curable resin such as urethane acrylate on the substrate 501 and by curing the resin by irradiating the resin with ultraviolet rays.

As illustrated in FIGS. 13 and 14, the first layer 504 is provided so that spaces between the adjacent portions of the second layer 505 that extend in the second direction $D_2$ are filled with the first layer 504. The first layer 504 is transparent. Moreover, the first layer 504 has adhesiveness. Due to the adhesiveness of the first layer 504, it is possible to bond the optical film 500 and the liquid crystal panel 15 together. That is, it is possible to bond the optical film 500 and the liquid crystal panel 15 together without additionally providing an adhesive layer or the like for bonding the optical film 500 and the liquid crystal panel 15. The first layer 504 may be formed of, for example, an acrylic adhesive film or a UV-curable adhesive.

The refractive index of the second layer 505 is higher than the refractive index of the first layer 504. As the difference between the refractive index of the second layer 505 and the refractive index of the first layer 504 increases, it becomes easier for an optical effect at the interface 520 between the second layer 505 and the first layer 504 to be produced. To be specific, the difference between the refractive index of the second layer 505 and the refractive index of the first layer 504 is preferably 0.05 or more 0.25 or less, and more preferably 0.10 or more and 0.20 or less. The refractive index of the second layer 505 is, for example, 1.6 or more, and the refractive index of the first layer 504 is, for example, 1.49 or less. It is possible to check the comparison between the refractive index of the second layer 505 with the refractive index of the first layer 504 by using, for example, the refraction direction or the total reflection condition of light that is incident on the interface between the second layer 505 and the first layer 504. It is possible to measure specific value of a refractive index by using, for example, an Abbe refractometer (for example, RX-7000α made by Atago Co., Ltd.).

The colored layer 550 absorbs a part of light to be transmitted. The colored layer 550 is stacked on a side of the second layer 505 of the optical functional layer 503. In the illustrated example, the colored layer 550 is disposed between the substrate 501 and the optical functional layer 503. The colored layer 550 may function as a primer layer that bonds the substrate 501 and the optical functional layer 503 together.

The colored layer 550 includes a transparent binder resin 551 and a plurality of coloring materials 552 contained in the binder resin 551. The binder resin 551 is made of, for example, urethane resin. The coloring materials 552 are, for example, dye or pigment having an average particle diameter of 1 μm or more and 10 μm or less, or colored beads colored with these. The particle diameter the coloring materials 552 can be measured, for example, from a SEM image. The size of the coloring materials 552 is preferably in the aforementioned range, because, if the coloring materials 552 are too large, the coloring materials 552 may cause local lack of light and may decrease the display quality of an image. The coloring materials 552 are appropriately selected from dyes or pigments of various colors so that the coloring materials 552 can absorb light in a specific color. Preferably, the coloring materials 552 have dark colors by being made from a pigment such as carbon black or titanium black so that the coloring materials 552 can absorb light in the entire visible light wavelength range. When the coloring materials 552 are particles containing carbon black, the particles may include carbon black and carbon black and an acrylic-styrene copolymer holding the carbon black. When the coloring materials 552 are particles containing carbon black, the particle diameter of the particles are determined by the particle diameter of secondary agglomerate. The term "dark color" refer to a color whose lightness indicated by the value of L*, which is one of L*, a*, and b* that are measurable in compliance with JIS Z 8781-4:2013, is less than 50. The value of lightness can be measured, for example, by using a combination of hyper-spectral camera HSI-1000 made by JFE Techno-Research Co. Ltd. and an optical microscope. According to the inventors' findings, in view of obtaining sufficient light absorption, the lightness (L*) of the coloring materials is preferably less than 40, more preferably less than 30, and further preferably less than 20.

When the coloring materials 552 are dye or pigment, the coloring materials 552 are included in the colored layer 550 by a proportion of 1.0 mass % or more and 5.0 mass % or less, and preferably by a proportion of 2.0 mass % or more and 4.0 mass % or less. On the other hand, when the coloring materials 552 are colored beads, the coloring materials 552 are included in the colored layer 550 by a proportion of 5.0 mass % or more and 25.0 mass % or less, and preferably by a proportion of 10.0 mass % or more and 20.0 mass % or less.

For example, when the specific gravity of the coloring materials 552 is extremely large or extremely small or under a condition that the specific gravity of the binder resin 551 is extremely small or the like, the aforementioned preferable ranges may possibly vary. In particular, when the coloring materials 552 are pigment or colored beads colored with pigment or dye, the numerical ranges of mass % are likely to vary. Therefore, in the present embodiment, when the coloring materials 552 are pigment or colored beads colored with pigment or dye, a condition under which the coloring materials 552 perform an optical function is specified as follows also in terms of the number of the coloring materials 552.

When the coloring materials 552 are pigment or colored beads colored with pigment or dye, in terms of the number of the coloring materials 552, the coloring material 552 content is specified as follows: that is, when the aforementioned weight % is converted into a number, the number of the coloring materials 552 is 1 or more and 25 or less per 900 $\mu m^2$ when the optical film 500 is seen in the thickness direction of the colored layer 550. To be more specific, the number of all of the coloring materials 552 that are visible when the optical film 500 is seen in the thickness direction of the colored layer 550 is counted, and the counted number of the coloring materials 552 is 1 or more and 25 or less.

The coloring material 552 content specified by the aforementioned weight % and the aforementioned number are values after the constituent elements of the optical film 500 have been cured. When the coloring materials 552 are included in the colored layer 550 by a proportion of 1.0 weight % or more and 5.0 weight % or less with respect to the total mass of the colored layer 550, it is possible to obtain a noticeable effect of improving the viewability of an image as described below, without excessively decreasing the luminance of the display device 10. Likewise, also in a case where the number of the coloring materials 552 is 1 or more and 25 or less per 900 $\mu m^2$ when the optical film 500 is seen in the thickness direction of the colored layer 550, it is possible to obtain a noticeable effect of improving the viewability of an image as described below, without excessively decreasing the luminance of the display device 10.

The weight % can be identified, for example, by using the size of the coloring materials 552 in a sectional SEM image, and the number of the coloring materials 552 measured by using an optical microscope and the area of the observation target. To be specific, the weight % of the coloring materials 552 in the colored layer 550 can be obtained by: identifying the particle weight of the coloring materials 552 per particle that is calculated based on the average diameter of the coloring materials 552 obtained from a sectional SEM image; and multiplying the particle weight by the number of the coloring materials 552 per unit area that is identified when the surface of the colored layer 550 is observed in the thickness direction by using an optical microscope.

The number of the coloring materials 552 per 900 $\mu m^2$ when the optical film 500 is seen in the thickness direction of the colored layer 550 can be obtained by: observing an image by using an optical microscope; and counting the number of the coloring materials 552 in the image.

To be more specific, the number of the coloring materials 552 can be identified as follows.

A sample is made by cutting out the optical film 500 with a certain size. The size of the sample is desirably 10×10 mm or more. This is because, if the sample is small, it is difficult to fix the sample onto a stage, an effect of microscopic deformation such as warping increases, and thus difficulty in observation increases. Then, the sample is set on the stage of an optical microscope. The optical microscope may be of any type, as long as the optical microscope allows magnification of 1000 times or more and observation in a transmitted light mode. It is possible to count the number of the coloring materials 552 per unit area by observing the sample on the stage with a magnification of, for example, 1000 times, and by counting the coloring materials 552 included in one layer or a plurality of layers.

The thickness of the colored layer 550 is preferably 1 $\mu m$ or more and 13 $\mu m$ or less, and more preferably 4 $\mu m$ or more and 7 $\mu m$ or less.

Preferably, the refractive index of the colored layer 550 is larger than the refractive index of the substrate 501 and is smaller than the refractive index of the second layer 505 of the optical functional layer 503. To be specific, the refractive index of the colored layer 550 is preferably 1.52 or more and 1.70 or less. In such a case, the quality of a displayed image can be improved, while suppressing loss of image light from the liquid crystal panel 15.

The coloring materials 552 need not be provided in the colored layer 550, and may be provided at any position in the optical film 500, as long as the position is closer to the second layer 505 than to the interface 520 between the second layer 505 and the first layer 504. For example, the coloring materials 552 may be provided to be contained in the second layer 505, or may be provided to be contained in the substrate 501.

Next, effects of the optical film 500 according to the present embodiment and the display device 10 including the optical film 500 will be described.

Figure 15:
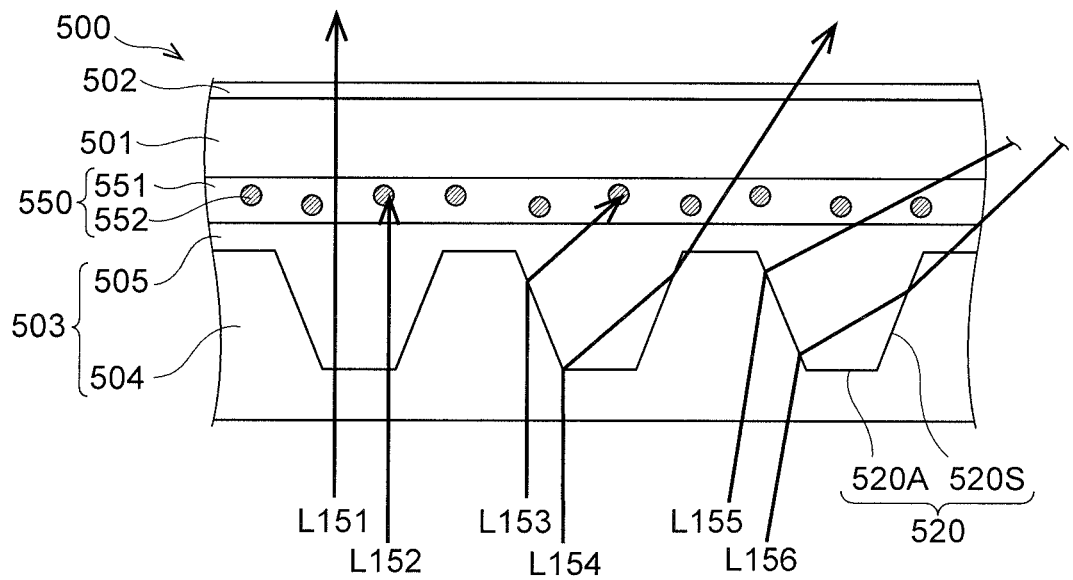
FIG. 15 illustrates effects on image light that is incident from the display device on the optical film according to the fifth embodiment.

Image light emitted from the display surface 15A of the liquid crystal panel 15 is incident on the optical functional layer 503 of the optical film 500. As illustrated in FIG. 15, the image light incident on the optical functional layer 503 first travels through the first layer 504, and next becomes incident on the interface 520 between the first layer 504 and the second layer 505.

The Image light that has traveled in the forward direction from the display surface 15A and become incident on the flat surface 520A of the interface 520 between the second layer 505 and the first layer 504 is, as shown by image light L151 and L152 in FIG. 15, transmitted through the optical functional layer 503 without receiving an optical effect in the optical functional layer 503, that is, without being refracted in the optical functional layer 503.

On the other hand, in the image light that is incident on the inclined surface 520S of the interface 520 between the second layer 505 and the first layer 504, each of image light L153 and L154 that travels in the forward direction and each of image light L155 and L156 that travels in a direction that is inclined with respect to the forward direction is refracted to increase the inclination angle with respect to the forward direction. Subsequently, some image light L153 and L155 is emitted from the optical functional layer 503, and the other image light L154 and L156 is further refracted at the interface 520 between the second layer 505 and the first layer 504 and then is emitted from the optical functional layer 503. Each of the image light L153 to L156 travels in a direction that is further inclined with respect to the first direction due to refraction at the interface 520 between the second layer 505 and the first layer 504 when being transmitted through the optical functional layer 503. That is, due to a refractive effect at the interface 520 between the second layer 505 and the first layer 504, when the image light is transmitted through the optical functional layer 503, the traveling direction of the image light with respect to the forward direction tends to increase as illustrated in FIG. 15. Accordingly, it becomes easier for image light to be emitted in a direction that is inclined from the forward direction toward the first direction $D_1$. Therefore, it is possible to clearly observe an image light also from a direction that is inclined toward the first direction $D_1$. That is, it is possible to increase the viewing angle of an image from the display device 10.

A part of image light that has been transmitted through the optical functional layer 503, which is image light L152 and L153 in the example illustrated in FIG. 15, is absorbed by the coloring materials 552 of the colored layer 550. Image light that is not absorbed by the coloring materials 552 of the colored layer 550, which is image light L151, L154, L155, and L156 in the example illustrated in FIG. 15, is transmitted through the optical film 500 and is observed by an external observer.

When such an optical film that can increase the viewing angle of an image is disposed to face the display surface of a liquid crystal panel, light that impairs the viewability of an image may be generated. Examples of light that is generated by disposing the optical film and that impairs the viewability of an image include light from the outside reflected inside of the optical film. It is required to absorb such light in order to suppress impairment of the viewability of an image.

In order to absorb such light, it is considered that a coloring material that absorbs light is added to the optical film. However, such a coloring material also absorbs image light from the display device. Therefore, when it is attempted to absorb light that impairs the viewability of an image, the viewability of the image itself is also impaired. The inventors have examined and found that it is possible to efficiently absorb light that impairs the viewability of an image by using a coloring material and by appropriately determining the position where the coloring material is provided in the optical film. That is, the inventors have found that it is possible to efficiently absorb light that impairs the viewability of an image while suppressing impairment of the viewability of an image. Hereafter, a principle that is conjectured to be capable of efficiently suppressing impairment of the viewability of an image will be described. However, the present embodiment is not limited to this conjecture.

In the optical film 500 according to the present embodiment, the coloring materials 552 is provided closer to the second layer 505 than to the interface 520 between the second layer 505 and the first layer 504 of the optical functional layer 503. In this case, as illustrated in FIG. 16, a part of light that is incident on the optical film 500 from the outside of the display device 10 is, as shown by light L161, absorbed by the coloring materials 552 of the colored layer 550. Another part of light that is incident on the optical film 500 from the outside is, as shown by light L162, transmitted through the colored layer 550 and becomes incident on the interface 520 between the second layer 505 and the first layer 504 of the optical functional layer 503. Subsequently, the light L162 is reflected at the interface 520, then becomes incident on the colored layer 550 again, and is absorbed by the coloring materials 552 of the colored layer 550. When the refractive index of the second layer 505 of the optical functional layer 503 is larger than the refractive index of the first layer 504, reflection of light in the optical film 500 tends to occur particularly at the interface 520. Light that is incident from the outside and reflected inside of the optical film 500 passes through the colored layer 550, including the coloring materials 552, twice. Accordingly, by providing the coloring materials 552 closer to the front surface, that is, closer to the second layer 505 than to the interface 520, it is possible to efficiently absorb light that is incident from the outside and reflected inside of the optical film 500. That is, it is possible to suppress emission, to the outside, of light L162 that is incident on the optical film from the outside and reflected in the optical film or of light L161 that is to be reflected in the optical film, and it is possible to suppress such light from impairing the viewability of an image displayed by the display device 10 in which the optical film 500 is disposed.

Light from the outside that is reflected inside of the liquid crystal panel 15 or the surface illuminant device 20 may also impair the viewability of an image, as with light reflected inside of the optical film 500. By providing the coloring materials 552 in the optical film 500, light that is incident from the outside and reflected inside of the liquid crystal panel 15 or the like passes through the colored layer 550 including the coloring materials 552 twice. Therefore, it is possible to suppress emission, to the outside, of light that is incident from the outside and reflected inside of the optical film 500 by efficiently absorbing the light, and it is possible to suppress the light from impairing the viewability of an image.

On the other hand, as illustrated in FIG. 15, image light emitted from the liquid crystal panel 15 passes through the colored layer 550 including the coloring materials 552 only once before the light is transmitted through the optical film 500 and emitted from the display device 10. Accordingly, image light is not absorbed by the coloring materials 552 as easily as light from the outside. Thus, because light from the outside is more easily absorbed than image light, it is possible to efficiently absorb light that is reflected inside of the optical film or the like and that impairs the viewability of an image, while suppressing impairment of an image due to absorption of image light.

The coloring materials 552 may be included in the substrate 501 or the second layer 505, but are preferably included in the colored layer 550. When the coloring materials 552 are included in the colored layer 550, it is possible to easily provide the coloring materials 552 at a desirable position in the optical film 500.

Moreover, the coloring materials 552 are included in the colored layer 550 by a proportion of 1.0 mass % or more and 5.0 mass % or less, and preferably by a proportion of 2.0 mass % or more and 4.0 mass % or less. When the coloring materials 552 are included by 1.0 mass % or more, it is possible to allow the coloring materials 552 to sufficiently absorb light that is incident from the outside and reflected inside of the optical film 500, which is to pass through the colored layer 550 twice. When the coloring materials 552 are included by 2.0 mass % or more, it is possible to allow the coloring materials 552 to sufficiently absorb light reflected inside of the optical film 500. That is, it is possible to suppress emission, to the outside, of light L162 that is incident on the optical film from the outside and reflected in the optical film or of light L161 that is to be reflected by the optical film, and it is possible to suppress the light from impairing the viewability of an image. When the coloring materials 552 are included by 5.0 mass % or less, it is possible to effectively suppress impairment of the viewability of an image by preventing excessive absorption of image light that is emitted from the liquid crystal panel 15 and that is to pass through the colored layer 550 once. Moreover, when the coloring materials 552 are included by 5.0 mass % or less, it is possible to effectively suppress impairment of the viewability of an image by preventing excessive absorption of image light by the coloring materials 552. To be specific, it is possible to make the proportion of image light absorbed by the colored layer 550 be 10% or less.

The coloring materials 552 have a black color. The coloring materials 552 having a black color can absorb light in the entire visible light wavelength range. Accordingly, it is possible to avoid collapsing of the color reproducibility of an image due to light that is incident on the optical film from the outside and that is reflected in the optical film. Moreover, it is possible to absorb only light having a specific wavelength and to avoid collapsing of the color reproducibility of image light.

Hereafter, the optical film 500 according to the fifth embodiment will be described in further detail by using Examples, but the optical film 500 according to the fifth embodiment is not limited to the following Examples.

As Examples, Reference Examples, and Comparative Examples, optical films that differ from each other in the position of coloring materials and the coloring material content were prepared. Each of the optical films includes a substrate and an optical functional layer stacked on the substrate. The optical functional layer includes a second layer and a first layer stacked on the second layer. The refractive index of the second layer is larger than the refractive index of the first layer. To be specific, the refractive index of the second layer is 1.65, and the refractive index of the first layer is 1.48. The interface between the second layer and the first layer has a recessed/protruding shape.

In Reference Example 1, the optical film does not include coloring materials. In Example 3 and Example 4, a colored layer including coloring materials having a black color is disposed between the substrate and the optical functional layer of the optical film of Reference Example 1. In Example 3, the coloring materials are included in the colored layer by a proportion of 2.0 mass %. In Example 4, the coloring materials are included in the colored layer by a proportion of 4.0 mass %. On the other hand, in Reference Example 2, the optical film does not include coloring materials as in Reference Example 1. In Comparative Example 3 and Comparative Example 4, coloring materials having a black color are included in the first layer of the optical film of Reference Example 2. In Comparative Example 3, the coloring materials are included in the first layer by a proportion of 2.0 mass %. In Comparative Example 4, the coloring materials are included in the first layer by a proportion of 4.0 mass %.

These optical films are disposed to face a display surface of a display device, and the front luminance of an optical-film-equipped display device was measured in a state in which an image in a white color was displayed on the display surface. The visible light reflectance of each optical film was measured. As the visible light reflectance, the reflectance (SCI) of total reflection including regular reflection was measured by using a spectrophotometer (CM-600d made by Konica Minolta).

Table 21 shows the measurement results of front luminance and visible light reflectance for Examples, Comparative Examples, and Reference Examples. In Examples 3 and 4, the ratio of front luminance thereof to that of Reference Example 1 was calculated, and, in Comparative Examples 3 and 4, the ratio of front luminance thereof to that of Reference Example 2 was calculated.

TABLE 21

|  | Front Luminance (cd/m$^2$) | Front Luminance Ratio | Reflectance of Total Reflection |
| --- | --- | --- | --- |
| Reference Example 1 | 684 | 1 | 2.63% |
| Example 3 | 649 | 0.949 | 2.36% |
| Example 4 | 617 | 0.902 | 2.18% |

TABLE 21-continued

|  | Front Luminance (cd/m$^2$) | Front Luminance Ratio | Reflectance of Total Reflection |
| --- | --- | --- | --- |
| Reference Example 2 | 705 | 1 | 2.64% |
| Comparative Example 3 | 665 | 0.943 | 2.44% |
| Comparative Example 4 | 636 | 0.902 | 2.33% |

From comparison in front luminance ratio between Reference Example 1, Example 3, Example 4, Reference Example 2, Comparative Example 3, and Comparative Example 4, it is understood that the front luminance decreases when the coloring materials are increased, irrespective of the position of the coloring materials. To be specific, from the result of the front luminance ratios of Example 3 and Comparative Example 3, it is understood that, when the coloring materials are included by 2.0 mass %, the front luminance decreases by about 5%, irrespective of the position of the coloring materials. From the result of the front luminance ratios of Example 4 and Comparative Example 4, it is understood that, when the coloring materials are included by 4.0 mass %, the front luminance decreases by about 10%, irrespective of the position of the coloring materials. In order to suppress decrease of the front luminance, to be specific, to make the proportion of decrease of front luminance be 10% or less, the coloring material content is preferably 4.0 mass % or less.

On the other hand, from comparison in reflectance of total reflection between Reference Example 1, Example 3, Example 4, Reference Example 2, Comparative Example 3, and Comparative Example 4, it is understood that the reflectance differs depending on the position of the coloring materials. That is, it is understood that it is possible to further suppress reflection by providing the coloring materials closer to the second layer than to the interface, to be specific, between the substrate and the optical functional layer as in Example 3 and Example 4 than by providing the coloring materials closer to the first layer than to the interface, to be specific, in the first layer as in Comparative Example 3 and Comparative Example 4.

From comparison between Example 3 and Example 4, it is understood that it is possible to further suppress emission of reflected light by increasing the coloring material content. To be specific, from comparison between Example 3 and Comparative Example 1, it is understood that it is possible to effectively suppress emission of reflected light in an optical stack by making the proportion of the coloring material content be 2.0 mass % or more.

From the facts described above, it is understood that, by providing the coloring materials at an appropriate position, to be specific, by providing the coloring material closer to the second layer than to the interface between the second layer and the first layer, it is possible to suppress reflection of light that is incident on the optical film from the outside while suppressing decrease of front luminance, that is, without increasing the amount of the coloring materials.

Heretofore, embodiments of the present invention have been described. However, the present invention is not limited to the configurations of the embodiments described above, and various modifications may be made. Configurations in the embodiments may be combined in any appropriate way. In this case, configurations of three or more embodiments may be combined.

Figure 17:
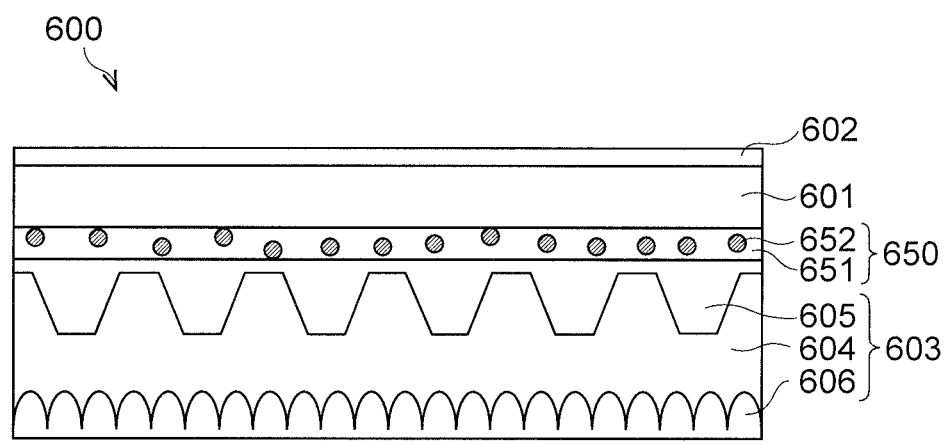
FIG. 17 is a sectional view illustrating a modification of an optical film.

For example, in the modification illustrated in FIG. 17, an optical film 600 includes a substrate 601, a surface member 602 provided on a front surface of the substrate 601, and an optical functional layer 603 provided on a back surface of the substrate 601. In the modification, the optical functional layer 603 includes a first layer 604, a second layer 605 that has a refractive index different from the refractive index of the first layer 604 and that is joined to the first layer 604 on the substrate 601 side of the first layer 604, and a third layer 606 that has a refractive index different from the refractive index of the first layer 604 and that is stacked to a side of the first layer 604 opposite to the second layer 605. A first interface between the first layer 604 and the second layer 605 has a recessed/protruding shape. A second interface between the first layer 604 and the third layer 606 has a recessed/protruding shape. Moreover, coloring materials 652 are provided closer to the second layer 605 than to the first interface. The refractive index of the second layer 605, the refractive index of the substrate 601, and the refractive index of the surface member 602 become smaller in this order. That is, the optical film 600 according to the modification illustrated in FIG. 17 has the features of the optical film 100 according to the first embodiment, the features of the optical film 400 according to the fourth embodiment, and the features of the optical film 500 according the fifth embodiment. The optical film 600 can provide advantageous effects of the optical film 100 according to the first embodiment, the optical film 400 according to the fourth embodiment, and the optical film 500 according the fifth embodiment described above.

Naturally, other combinations of the configurations of the embodiments are possible.

Figure 18:
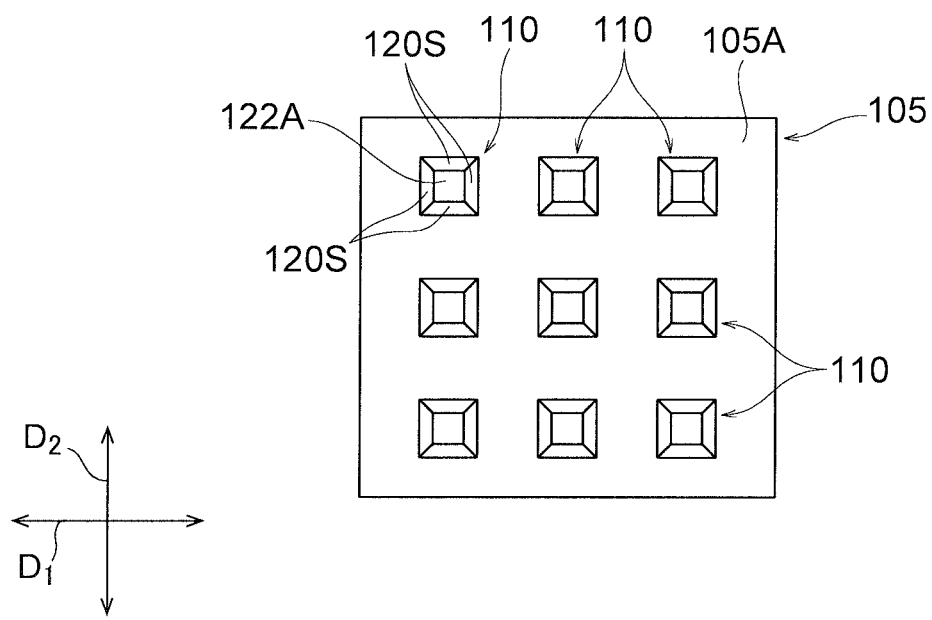
FIG. 18 illustrates a modification of lens portions of an optical film according to each embodiment.

For example, in each of the embodiments described above, the lens portions 110 have an elongated shape along the film surface. However, as illustrated in FIG. 18, the lens portions 110 may be arranged in a matrix pattern on the film surface. In the example illustrated in FIG. 18, the lens portions 110 each have a truncated quadrangular pyramidal shape. However, the lens portions 110 may each have a circular truncated cone shape, a truncated hexagonal pyramidal shape, a truncated octagonal pyramidal shape, or the like. The optical film 100 or 100-2 according to the first or second embodiment described above may be integrated with a polarizing plate (the upper polarizing plate 13) and may be distributed in the form of an optical-film-equipped polarizing plate. The optical film 100-3 according to the third embodiment described above may be integrated with the circularly polarizing plate 220 and may be distributed in the form of an optical-film-equipped polarizing plate in accordance with the use thereof.

Moreover, in each of the embodiments described above, the polarizing plate (upper polarizing plate) 13 is joined to the low-refractive index layer 104 of the optical film 100 (the first layer 404 or 504 of the optical film 400 or 500). However, a polarizer of the polarizing plate may be joined to the optical film.

Figure 19:
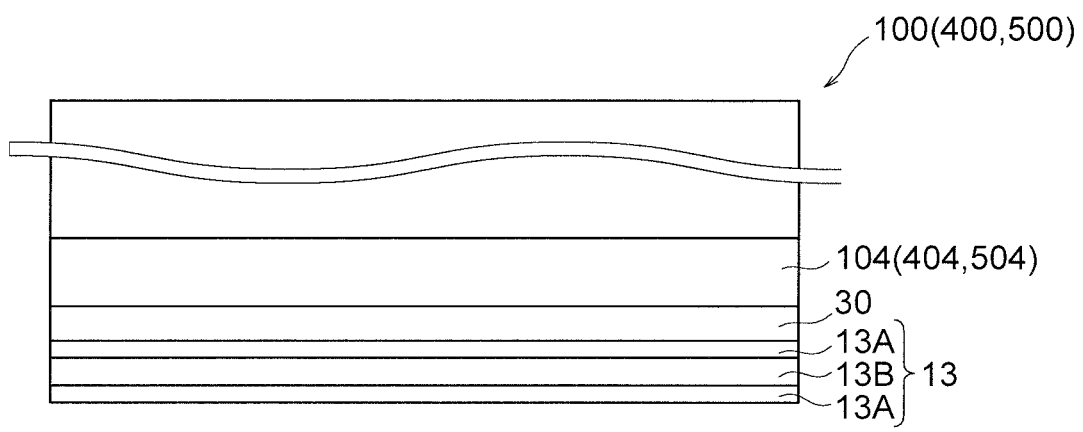
FIG. 19 illustrates a state in which a polarizing plate is affixed to an optical film.

To be more specific, in each of the embodiments described above, the polarizing plate 13 includes a pair of protective films 13A and a polarizer 13B disposed between the pair of protective films 13A. Accordingly, the protective film 13A of the polarizing plate 13 is joined to the low-refractive index layer 104 (the first layer 404 or 504) of the optical film. When a layer of the optical film in contact with the polarizing plate 13, for example, the low-refractive index layer 104 (the first layer 404 or 504) also serves as an adhesive layer for the polarizing plate 13, the polarizing plate 13 is directly affixed to the optical film. Alternatively, as illustrated in FIG. 19, when an adhesive layer 30 is disposed between the optical film and the polarizing plate 13, the polarizing plate 13 is affixed to the optical film via the adhesive layer 30.

Figure 20:
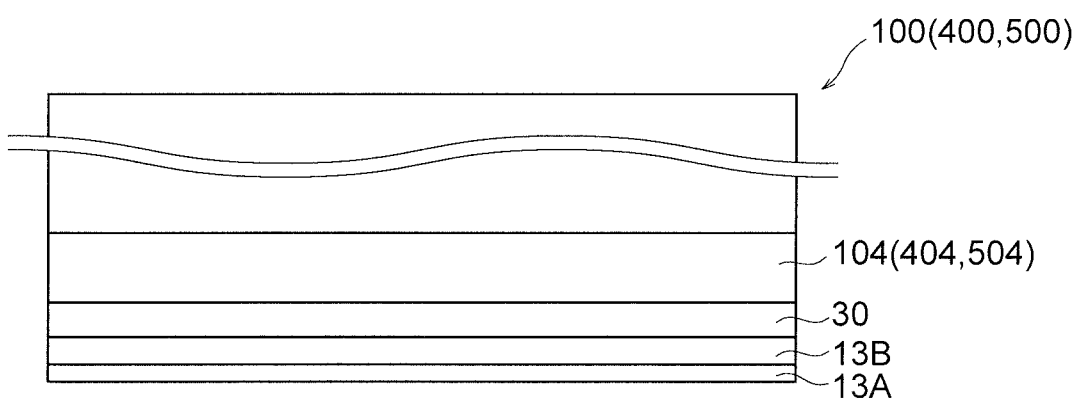
FIG. 20 illustrates a state in which a polarizer is affixed to an optical film.

However, the protective film 13A may be omitted, and the polarizer 13B may be joined to the low-refractive index layer (first layer) of the optical film. When a layer in contact with the polarizer 13B of the optical film, for example, the low-refractive index layer 104 (the first layer 404 or 504) also serves as an adhesive layer for the polarizing plate 13, the polarizer 13B is directly affixed to the optical film. Alternatively, as illustrated in FIG. 20, when the adhesive layer 30 is disposed between the optical film and the polarizer 13B, the polarizer 13B is affixed to the optical film via the adhesive layer 30.

REFERENCE SIGNS LIST 10, 10-2, 10-3 display device
12 liquid crystal layer
13 upper polarizing plate
14 lower polarizing plate
15 liquid crystal panel
15A display surface
15B back surface
20 surface illuminant device
21 light emitting surface
30 adhesive layer
100, 100-2, 100-3, 400, 500, 600 optical film
101, 401, 501, 601 substrate
101A front surface
101B back surface
102, 402, 502, 602 surface member
103, 403, 503, 603 optical functional layer
104, 404, 504, 604 low-refractive index layer (first layer)
105, 405, 505, 605 high-refractive index layer (second layer)
406, 606 third layer
105A layer body
110 lens portion
120, 420, 520 recessed/protruding shape (interface)
120S, 420S, 520S side surface (inclined surface)
121 recessed portion
121A flat portion
122 protruding portion
122A flat portion
215 organic LED panel
220 circularly polarizing plate
230 touch panel
240 cover glass
251 first adhesive layer
252 second adhesive layer
253 third adhesive layer

The invention claimed is:
1. An optical film comprising:
a substrate;
a surface member provided on a front surface of the substrate; and
an optical functional layer provided on a back surface of the substrate,
wherein the optical functional layer includes a first layer and a second layer that has a refractive index different from a refractive index of the first layer and that is joined to the first layer on the substrate side of the first layer,
wherein a first interface between the first layer and the second layer has a recessed/protruding shape,
wherein the refractive index of the second layer, a refractive index of the substrate, and a refractive index of the surface member become smaller in this order, and wherein a coloring material is provided closer to the second layer than to the first interface.

2. The optical film according to claim 1, wherein the refractive index of the first layer is smaller than the refractive index of the second layer.

3. The optical film according to claim 1, wherein each of recessed portions and protruding portions of the recessed/protruding shape includes a flat portion extending along a film surface of the optical film.

4. The optical film according to claim 1,
wherein the optical functional layer further includes a third layer stacked to a side of the first layer opposite to the second layer,
wherein the refractive index of the first layer is different from a refractive index of the third layer, and
wherein a second interface between the first layer and the third layer has a recessed/protruding shape.

5. The optical film according to claim 4, wherein the refractive index of the first layer is smaller than the refractive index of the third layer.

6. The optical film according to claim 4, wherein the refractive index of the first layer is larger than the refractive index of the third layer.

7. The optical film according to claim 4, wherein a pitch of recesses and protrusions of the recessed/protruding shape of the first interface is larger than a pitch of recesses and protrusions of the recessed/protruding shape of the second interface.

8. The optical film according to claim 1, further comprising a colored layer stacked to a side of the second layer of the optical functional layer,
wherein the coloring material is included in the colored layer.

9. The optical film according to claim 8, wherein the coloring material is included in the colored layer by a proportion of 1.0 mass % or more and 5.0 mass % or less.

10. The optical film according to claim 1, wherein the coloring material has a black color.

11. The optical film according to claim 1, wherein, in the optical film, the first layer has adhesiveness.

12. A display device comprising:
the optical film according to claim 1; and
a liquid crystal panel,
wherein the optical film is disposed so that the first layer faces a display surface side of the liquid crystal panel with respect to the second layer.

13. A display device comprising:
the optical film according to claim 1; and
an organic LED panel,
wherein the optical film is disposed so that the first layer faces a display surface side of the organic LED panel with respect to the second layer.

14. An optical-film-equipped polarizing plate comprising:
the optical film according to claim 1; and
a polarizing plate affixed to the optical film.

15. The optical-film-equipped polarizing plate according to claim 14, wherein a layer of the optical film in contact with the polarizing plate also serves as an adhesive layer for the polarizing plate.

16. The optical-film-equipped polarizing plate according to claim 14, further comprising an adhesive layer between the optical film and the polarizing plate.

17. An optical-film-equipped polarizing plate comprising:
the optical film according to claim 1;
a polarizer affixed to the optical film; and
an adhesive layer affixing the optical film and the polarizer to each other,
wherein the polarizer is affixed to the optical film via only the adhesive layer.

18. An optical-film-equipped polarizing plate comprising:
the optical film according to claim 1; and
a polarizer affixed to the optical film,
wherein a layer of the optical film in contact with the polarizer also serves as an adhesive layer for the polarizer, and
wherein the polarizer is directly affixed to the optical film.

19. An optical film comprising:
a substrate;
a surface member provided on a front surface of the substrate; and
an optical functional layer provided on a back surface of the substrate,
wherein the optical functional layer includes a first layer and a second layer that has a refractive index different from a refractive index of the first layer and that is joined to the first layer on the substrate side of the first layer,
wherein a first interface between the first layer and the second layer has a recessed/protruding shape,
wherein the refractive index of the second layer, a refractive index of the substrate, and a refractive index of the surface member become smaller in this order, and
wherein the refractive index of the first layer is larger than the refractive index of the second layer.

20. An optical film comprising:
a substrate;
a surface member provided on a front surface of the substrate; and
an optical functional layer provided on a back surface of the substrate,
wherein the optical functional layer includes a first layer and a second layer that has a refractive index different from a refractive index of the first layer and that is joined to the first layer on the substrate side of the first layer,
wherein a first interface between the first layer and the second layer has a recessed/protruding shape,
wherein the refractive index of the second layer, a refractive index of the substrate, and a refractive index of the surface member become smaller in this order,
wherein the optical functional layer further includes a third layer stacked to a side of the first layer opposite to the second layer,
wherein the refractive index of the first layer is different from a refractive index of the third layer, and
wherein a second interface between the first layer and the third layer has a recessed/protruding shape.

* * * * *